(12) United States Patent
Tanaka et al.

(10) Patent No.: US 7,482,051 B2
(45) Date of Patent: *Jan. 27, 2009

(54) STRUCTURE OF INFLATABLE AIR-PACKING DEVICE HAVING CHECK VALVE AND MULTIPLE AIR BUBBLES

(75) Inventors: Yasuzumi Tanaka, Kawasaki (JP); Wei-Wen Peng, Lake Forest, CA (US)

(73) Assignee: Air-Paq, Inc., Lake Forest, CA (US)

( * ) Notice: Subject to any disclaimer, the term of this patent is extended or adjusted under 35 U.S.C. 154(b) by 525 days.

This patent is subject to a terminal disclaimer.

(21) Appl. No.: 11/103,027

(22) Filed: Apr. 11, 2005

(65) Prior Publication Data

US 2006/0228527 A1  Oct. 12, 2006

(51) Int. Cl.
*B32B 1/06* (2006.01)
*B65D 81/03* (2006.01)
*B65D 85/30* (2006.01)
*B61D 45/00* (2006.01)

(52) U.S. Cl. ............... 428/178; 428/188; 410/119; 383/3; 383/58; 206/522

(58) Field of Classification Search ............ 428/166, 428/178, 188; 410/119; 206/320, 522; 383/3, 383/38, 58

See application file for complete search history.

(56) References Cited

U.S. PATENT DOCUMENTS

| 6,038,834 | A | 3/2000 | Haley | |
|---|---|---|---|---|
| 6,410,119 | B1 * | 6/2002 | De Luca et al. | 428/166 |
| 6,629,777 | B2 * | 10/2003 | Tanaka et al. | 383/3 |
| 6,761,960 | B2 | 7/2004 | De Luca et al. | |
| 7,000,767 | B2 * | 2/2006 | Tanaka et al. | 206/522 |
| 7,204,278 | B2 * | 4/2007 | Koyanagi et al. | 141/114 |
| 2003/0096068 | A1 * | 5/2003 | Peper | 428/34.1 |

* cited by examiner

*Primary Examiner*—Donald Loney
(74) *Attorney, Agent, or Firm*—Finnegan, Henderson, Farabow, Garrett & Dunner LLP

(57) ABSTRACT

A bubble wrapping sheet has a simple structure and can easily inflate all of the air bubbles to wrap a product to be protected. The air bubbles can be constructed by tube partition seals that create air tubes and by bubble partition seals that divide the air tubes into a plurality of series connected air bubbles. The shape and size of the tube partition seals and bubble partition seals can be modified to change the shape of air bubbles and the density of the air bubbles on the bubble wrapping sheet. A check valve for the bubble wrapping sheet is provided to each air tube. The check valve may be configured by an air flow maze portion having a zig-zag air passage and a common air duct portion which provides the air to the air flow maze portion of a current air tube as well as to the air flow maze portion of a next air tube.

18 Claims, 27 Drawing Sheets

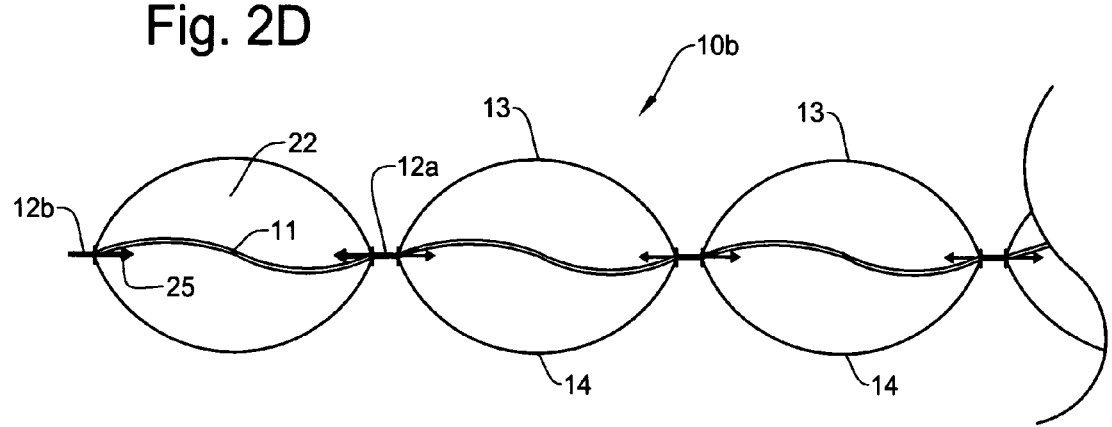
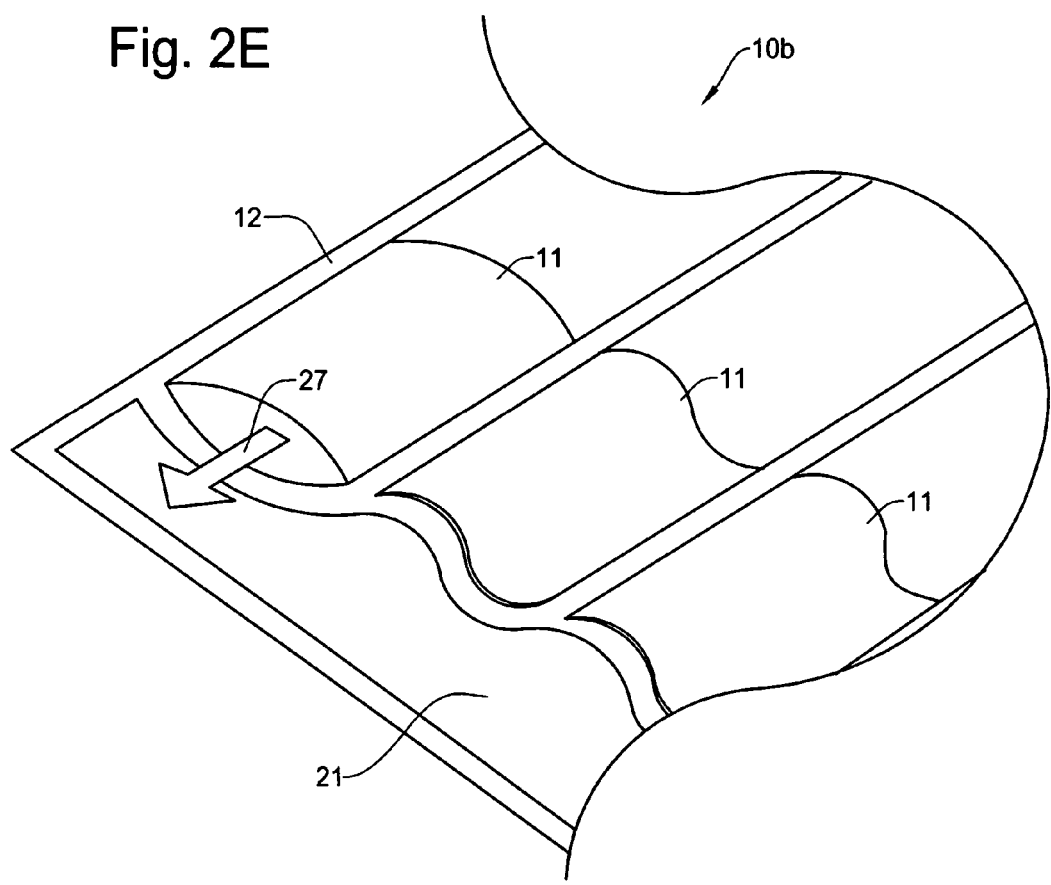

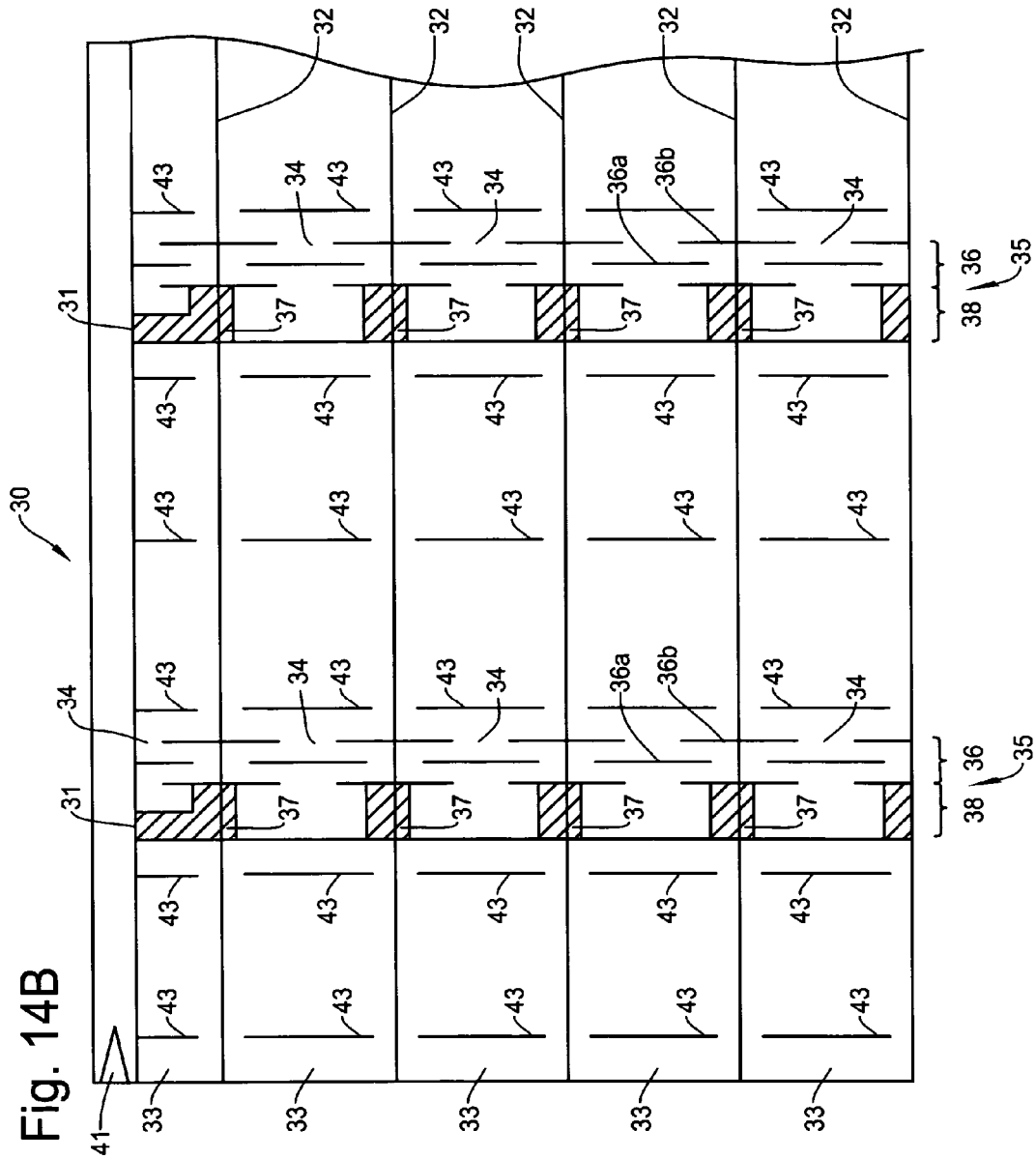

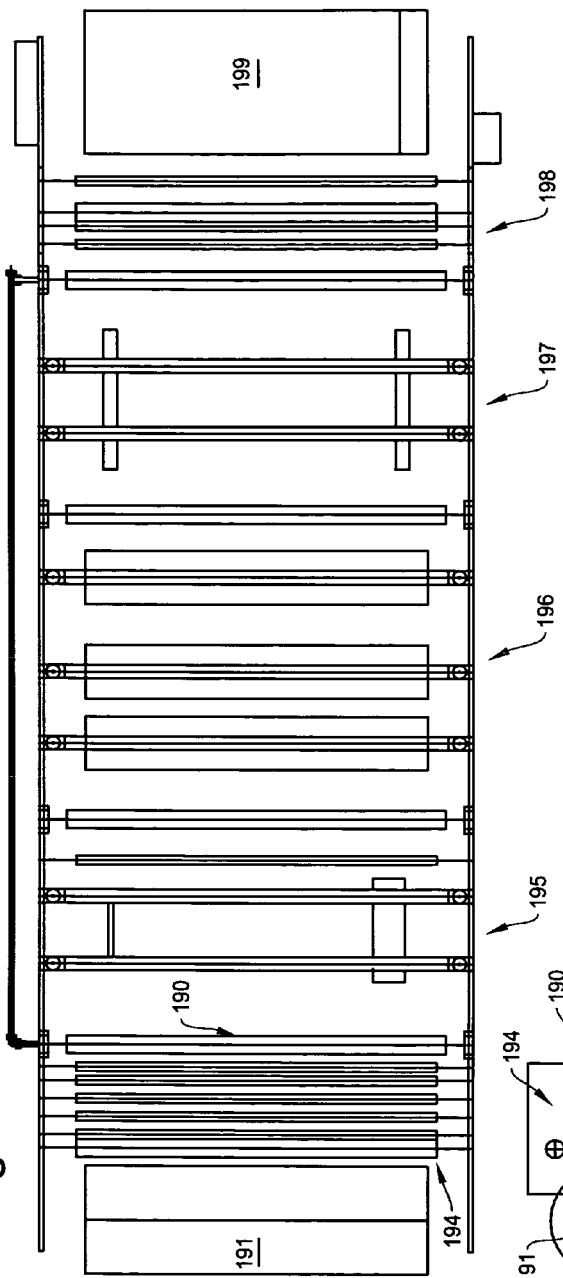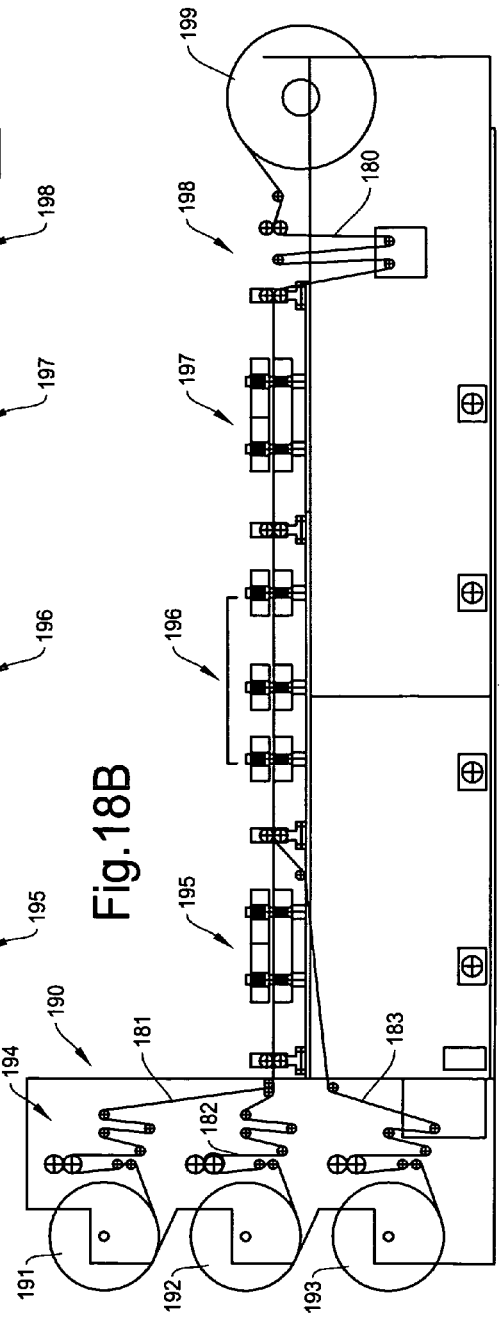
Fig. 18A
Fig. 18B

STRUCTURE OF INFLATABLE AIR-PACKING DEVICE HAVING CHECK VALVE AND MULTIPLE AIR BUBBLES

FIELD OF THE INVENTION

This invention relates to an air-packing device having a check valve for packing a product to protect the product from shocks and vibrations, and more particularly, to a structure of an air-packing device having a plurality of inflatable air bubbles and one or more check valves where the air bubbles will be filled with compressed air through the check valves when wrapping a product.

BACKGROUND OF THE INVENTION

In a product distribution channel such as product shipping, a styroform packing material has been used for packing commodity and industrial products. Although the styroform package material has a merit such as a good thermal insulation performance and a light weight, it has also various disadvantages: recycling the styroform is not possible, soot is produced when it burns, a flake or chip comes off when it is snagged because of it's brittleness, an expensive mold is needed for its production, and a relatively large warehouse is necessary to store it.

Therefore, to solve such problems noted above, other packing materials and methods have been proposed. One method is a fluid container (hereafter "air-packing device") which sealing contains fluid such as liquid or gas, typically, air. The air-packing device has excellent characteristics to solve the problems involved in the styroform. First, because the air-packing device is made of only thin sheets of plastic films, it does not need a large warehouse to store it unless the air-packing device is inflated. Second, a mold is not necessary for its production because of its simple structure. Third, the air-packing device does not produce a chip or dust which may have adverse effects on precision products. Also, recyclable materials can be used for the films forming the air-packing device. Further, the air-packing device can be produced with low cost and transported with low cost.

FIG. 1 shows an example of air-packing device in the conventional technology. The air-packing device 10a is composed of first and second thermoplastic films 13 and 14, and a check valve 11. Typically, each thermoplastic film is composed of three layers of materials: polyethylene, nylon and polyethylene which are bonded together with appropriate adhesive or other means. The first and second thermoplastic films 13 and 14 are heat-sealed together at predetermined seal portions 12a, 12b to air-tightly close after the check valve 11 is attached. Thus, one air-packing device 10a sealed with the heat seal portions 12a, 12b is formed as shown in FIG. 1.

FIGS. 2A-2B show another example of an air-packing device 10b with multiple air containers where each air container is provided with a check valve. A main purpose of having multiple air containers is to increase the reliability. Namely, even if one of the air containers suffers from an air leakage for some reason, the air-packing device can still function as a cushion or shock absorber for protecting a product because other air containers are intact since the air containers are independent from one anther by having the corresponding check valve.

With reference to FIG. 2A, this fluid container 10b is made of the first and second thermoplastic films which are bonded together around a rectangular periphery 23a and further bonded together at each boundary of two air containers 22 so that a guide passage 21 and air containers 22 are created.

When the first and second thermoplastic films 13 and 14 are bonded together, as shown in FIG. 2A, the check valves 11 are also attached to each inlet port of the air container 22. By attaching the check valves 11, each air container 22 becomes independent from the other. The inlet port 24 of the air-packing device 10b is used when filling a fluid (typically an air) to each air container 22 by using, for example, an air compressor.

FIG. 2B shows the air-packing device 10b of FIG. 2A when inflated with the air. First, each air container 22 is filled with the air from the inlet port 24 through the guide passage 21 and the check valve 11. To avoid a rupture of the air containers by variations in the environmental temperature, the air into the container is typically stopped when the air container 22 is inflated at about 90% of its full expansion rate. After filling the air, the expansion of each air container is maintained because each check-valve 11 prevents the reverse flow of the air. Typically, an air compressor has a gauge to monitor the supplied air pressure, and automatically stops supplying the air to the air-packing device 10b when the pressure reaches a predetermined value.

The check valve 11 is typically made of two rectangular thermoplastic valve films which are bonded together to form a fluid pipe. The fluid pipe has a tip opening and a valve body to allow a fluid flowing through the fluid pipe from the tip opening but the valve body prevents the reverse flow. Examples of structure of check-valve are described in more detail in the U.S. Pat. Nos. 5,209,264, 5,927,336 and 6,629,777. This check valve is attached to the thermoplastic films of the air packing device during or after the manufacturing process of the air-packing device.

As shown in FIGS. 2C-2E, the conventional check valves have problems. For example, when the air-packing device 10b is inflated, both sides 23a and 23b of the check valve body is pressed inwardly by the expansion of the air container 22. The directions of the pressing force is shown by arrows 25 in FIG. 2C. As a result, the check valves 11 become wavy such as shown in FIG. 2D although the bonded portion 12 is straight before the air-packing device 10b is inflated.

As mentioned above, the check valve 11 is typically made of two sheets of thermoplastic film. By the pressure noted above, sometimes, a gap is created between the thermoplastic films in the check-valve 11 of the air container 22. Thus, the air is leaked through the gap as shown in FIG. 2E where the leakage in the check valve 11 is shown by an arrow 27. In other words, the reverse flow in the air container by the check valve 11 occurs and the air from the air container 22 flows into the guide passage 21 in this example.

When using the check valves describe above, the pressure required to fill the fluid container can be large because when the air container is long and the guide passage 21 is narrow. This is especially true when each air container is configured by a plurality of air cells connected in series because the air has to be supplied from one end to another end of the air-packing device through many air cells. This can be a problem when the air compressor does not have much power to supply air with high pressure, or the part of the air-packing device closer to the air input may be damaged.

Still other problem with regard to the air-packing device having the conventional check valves described above lies in the inflexibility in mounting the check valve. As shown in FIGS. 2A-2B, the check valves 11 must be positioned adjacent to the guide passage 21, i.e. the air inlet port 24. Because the guide passage 21 must be positioned at the very end of the air-packing device 10b, freedom of designing the shape of the air-packing devices is severely limited.

As described in the foregoing, the air-packing device using the check valves is highly useful for packing commodity products and industrial products instead of the styroform packing. However, the conventional check valves the problems as described above. Thus, there is a strong need for a check valve that can solve the above noted problems and an air-packing device implementing the new check valves.

Another example of air-packing device is a bubble wrapping sheet which is widely used to package a product. An example of a bubble wrapping sheet is shown in the perspective view of FIG. 2F. A bubble wrapping sheet 107 comprises wrap sheet 105 and a plurality of air bubbles 103 each containing an air therein. The air bubbles 103 protect a product when the bubble wrap sheet 107 wraps the product. The air bubbles 103 permanently entrap air at the time they are manufactured.

Although bubble wrapping sheets are versatile in wrapping products of various sizes and configurations, they have a shortcoming that they are bulky due to the air bubbles filled with air. Because the air bubbles contain air when the bubble wrapping sheets are manufactured, transportation to a place where the bubble wrapping sheets are to be used is inefficient because the rolls of bubble wrapping sheets are large. Because they are large, they also require a large storage space. Moreover, although the air bubbles are filled with air, because the air in the air bubble is not a compressed air, each air bubble does not have a strong elastic force. Thus, to fully protect the product therein, it is usually necessary to wrap the product in two or more times by the bubble wrapping sheet, which consumes a large amount of bubble wrapping sheet.

SUMMARY OF THE INVENTION

It is, therefore, an object of the present invention to provide a structure of an air-packing device having check valves and a plurality of air bubbles where the air-packing device will be inflated by the compressed air only immediately before wrapping a product to be protected.

It is another object of the present invention to provide a structure of check valves incorporated in the air-packing device which is a wrapping sheet to allow the compressed air be filled in the air bubbles and to prohibits the reverse flow of the compressed air.

It is a further object of the present invention to provide an air-packing device having check valves and a plurality of air bubbles where the air-packing device is a flat thin sheet without being filled with air before being used so that a large amount of air-packing devices can be easily transported and stocked with low cost.

One aspect of the present invention is an air-packing device which is a bubble wrapping sheet that can sealingly contain air (fluid) for protecting a product. The air-packing device comprises first and second thermoplastic films superposed with each other, tube partition seals to create air tubes, bubble partition seals located between the tube partition seals to partition the air tubes into a plurality of air bubbles, where the length of the bubble portion seals is shorter than the width between adjacent the tube partition seals, and where predetermined portions of first and second thermoplastic films are bonded at the tube partition seals to create air tubes, and at the bubble partition seals to create air bubbles.

It also comprises a plurality of check valves established between the first and second thermoplastic films for the corresponding air tubes, each of the check valves allowing the compressed air to flow in a predetermined direction of the check valve, an air input formed on one of the check valves to supply the compressed air to all of the air tubes through the check valves.

The check valve is configured by an air flow maze portion forming an air passage of a zig-zag shape for supplying the air to a corresponding air tube having one or more series connected air bubbles, and a common air duct portion which provides the air to the air flow maze portion of a current air tube as well as to the air flow maze portion of a next air tube.

The size and shape of the bubble partition seals and tube partition seals can be modified to change the shape of the air bubbles and the density of the air bubbles. The bubble partition seals may be configured to be wider in the direction of the air tube. The bubble partition seals may be shaped to be an inwardly curved configuration to make circular air bubbles. The tube partition seals are wider so that each adjacent air tube is located far from one another. The tube partition seals may also be shaped to be a wave-like configuration with curvature to make circular bubble bags.

Another aspect of the present invention is to provide an inflatable bubble wrap that sealingly contains air for protecting a product that has, in addition to the configurations above, a master inlet port connected to the air inputs of the check valves, and a master durable check valve located at one end of the master inlet port, wherein the compressed air is supplied from the master durable check valve to each check valve through the master inlet to inflate each air tubes and air bubbles.

BRIEF DESCRIPTION OF THE DRAWINGS

FIGS. 2A-2E are schematic diagrams showing an example of structure of an air-packing device having a plurality of air cells and corresponding check valves in the conventional technology.

FIG. 3A is a plan view showing a structure of check valves and air bubbles on an air-packing device, FIG. 3B is a plan view showing the check valves and air bubbles including flows of air indicated by dotted arrows when a compressed air is supplied thereto, FIG. 3C is a plan view showing the heat-seal portions for bonding the check valve sheet to one of plastic films of the air-packing device, and FIG. 3D is a plan view showing the heat-seal portions for bonding the check valve sheet and the two plastic films of the air-packing device.

FIG. 14B is a plan view showing a further embodiment of bubble wrapping sheet that includes two or more sets of check valves and a master check valve.

FIGS. 18A-18B are schematic diagrams showing another example of structure of production system for performing a heat-sealing process for producing air-packing devices of the present invention, where FIG. 18A is a plan view thereof and FIG. 18B is a front view thereof.

DETAILED DESCRIPTION OF THE INVENTION

The present invention provides a structure of air-packing device having check valves for use in an air bubble wrapping sheet. Thus, hereafter, the terms "air-packing device" and "bubble wrapping sheet" are interchangeably used. The conventional bubble wrapping sheet does not have check valves so that the air bubbles are filled with air with low air pressure at the very beginning of the production. Thus, a roll of bubble wrapping sheets becomes large in size, which decreases an efficiency in distribution from the manufacturer of the bubble wrapping sheets to the users. Because the roll of bubble wrapping sheet is large, the manufacturer and the user need a large storage space for stocking the bubble wrapping sheets.

In the present invention, since the bubble wrapping sheet has a set of check valves, the user can fill in the compressed air through the check valves only when using the bubble wrapping sheet. In other words, the bubble wrapping sheets are thin sheets when not being used. Thus, a large amount of bubble wrapping sheets can be transported by a small cargo and stored in a small storage space. Moreover, because of the check valves, the compressed air can be filled in the air bubbles of the bubble wrapping sheets at relatively high pressure, thus, the bubble wrapping sheet has a sufficient elastic force and thickness when inflated by the compressed air. The bubble wrapping sheet can fully protect the product therein by wrapping the produce by once. That is, unlike the conventional wrapping sheet, it is unnecessary to wrap the product in two or more times.

The check valve has a simple structure and can be attached at any locations of the bubble wrapping sheet. Further, the check valve in the present invention can be easily manufactured without major changes of an existing manufacturing apparatus. Typically, the bubble wrapping sheet incorporating the check valves of the present invention wraps the product to be protected and packed in a container box. It should be noted that although the present invention is described for the case of using an air for inflating the bubble wrap sheets for an illustration purpose, other fluids such as other types of gas or liquid can also be used.

Figure 1:
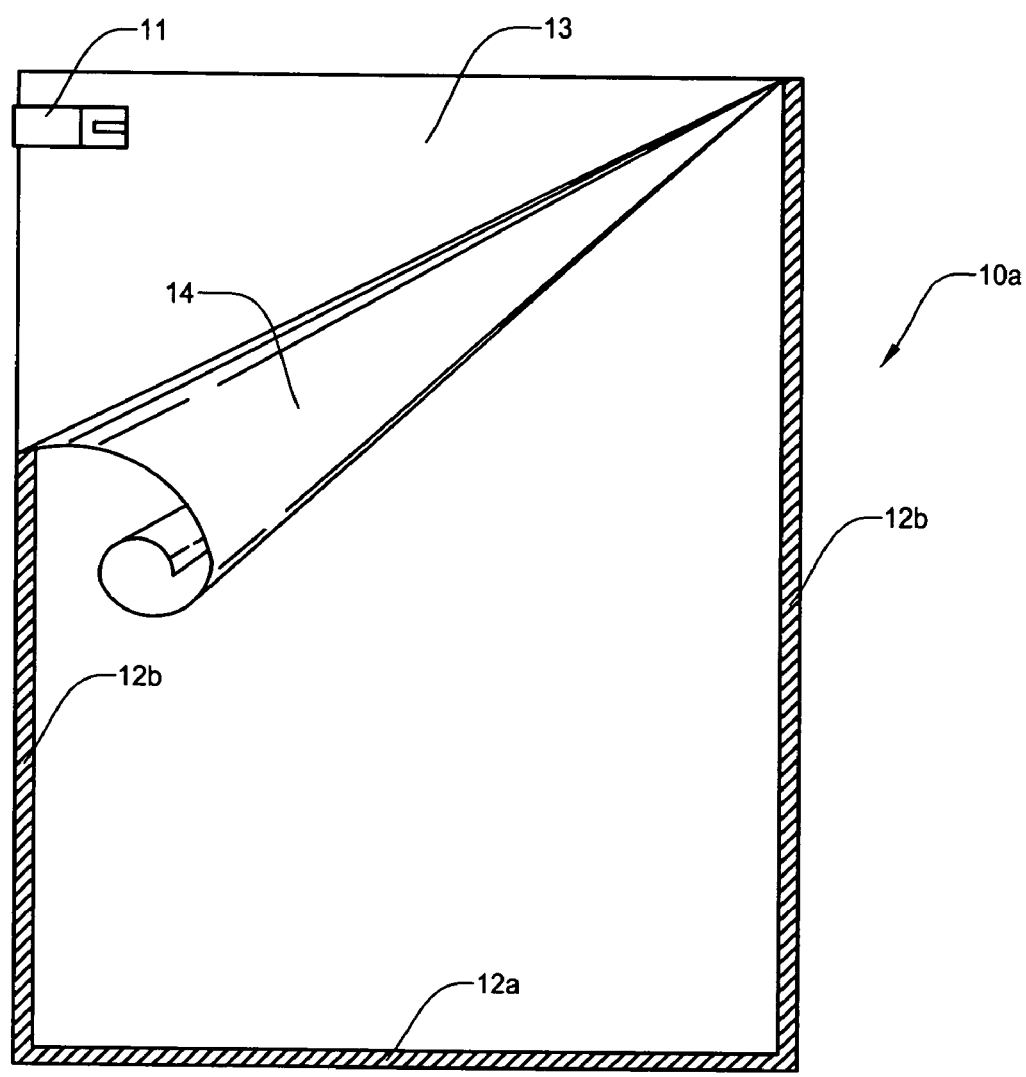
FIG. 1 is a schematic diagram showing an example of structure of an air-packing device with a single air container in the conventional technology.
Figure 2A:
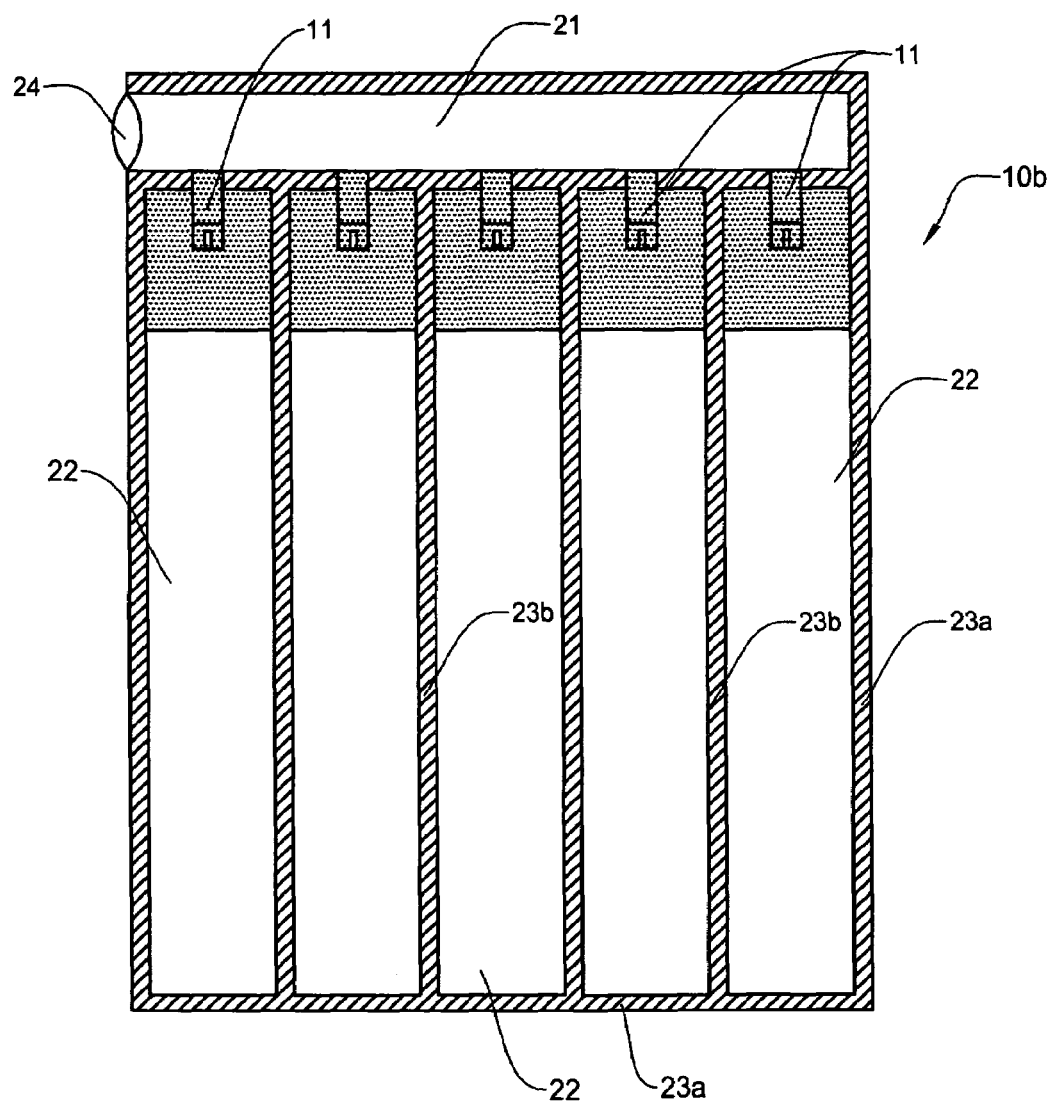
Figure 2B:
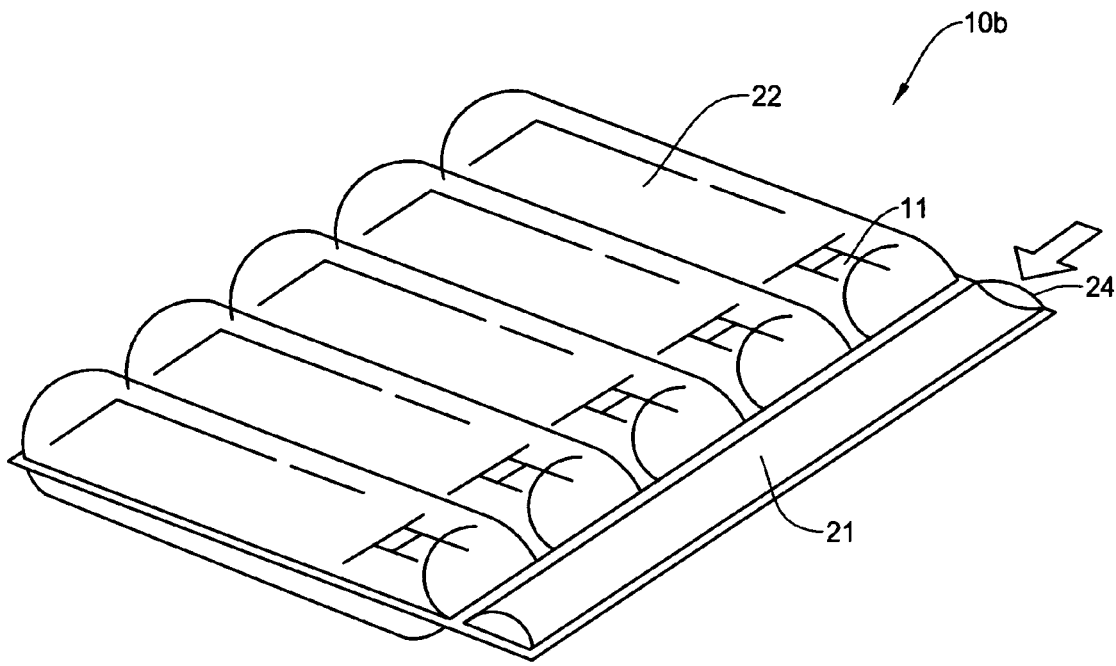
Figure 2C:
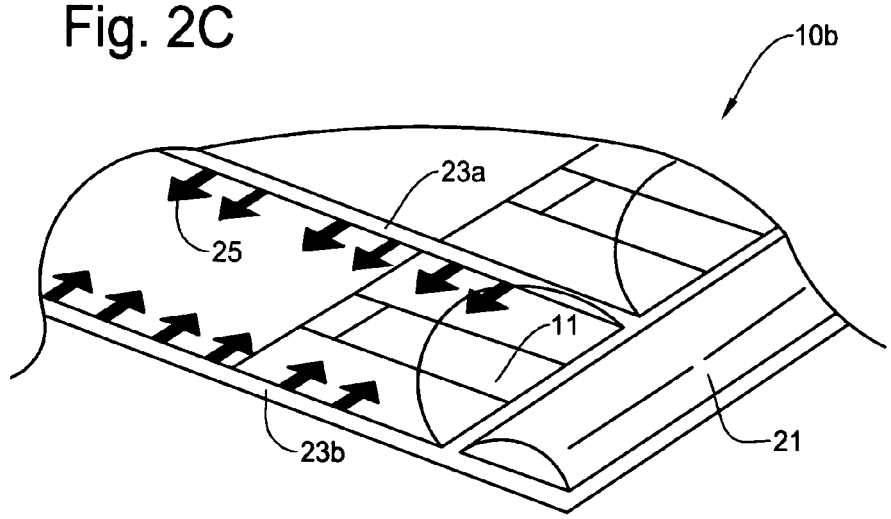
Figure 2F:
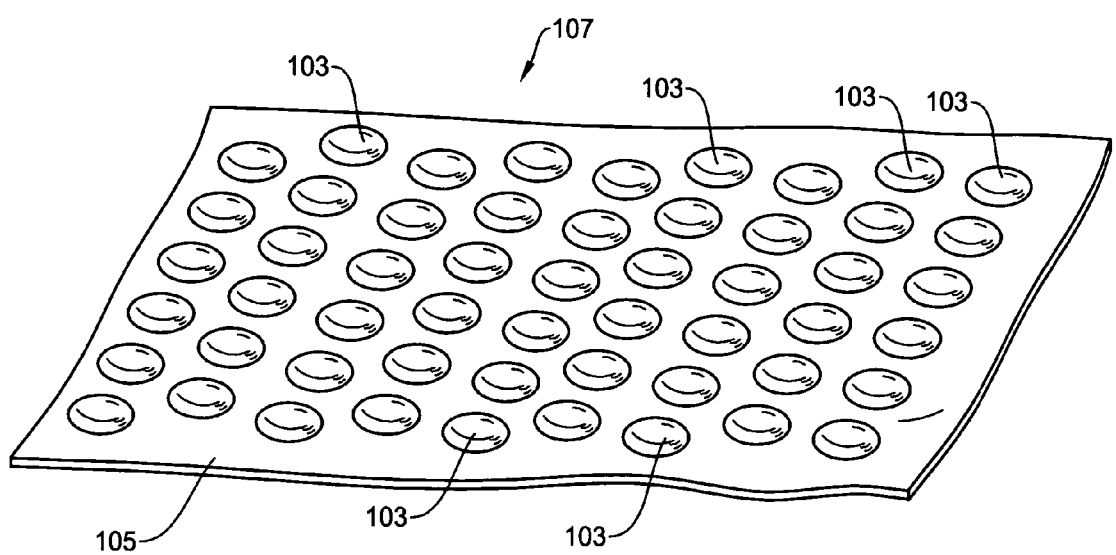
FIG. 2F is a schematic diagram showing an example of structure of a bubble wrapping sheet in the conventional technology.
Figure 3A:
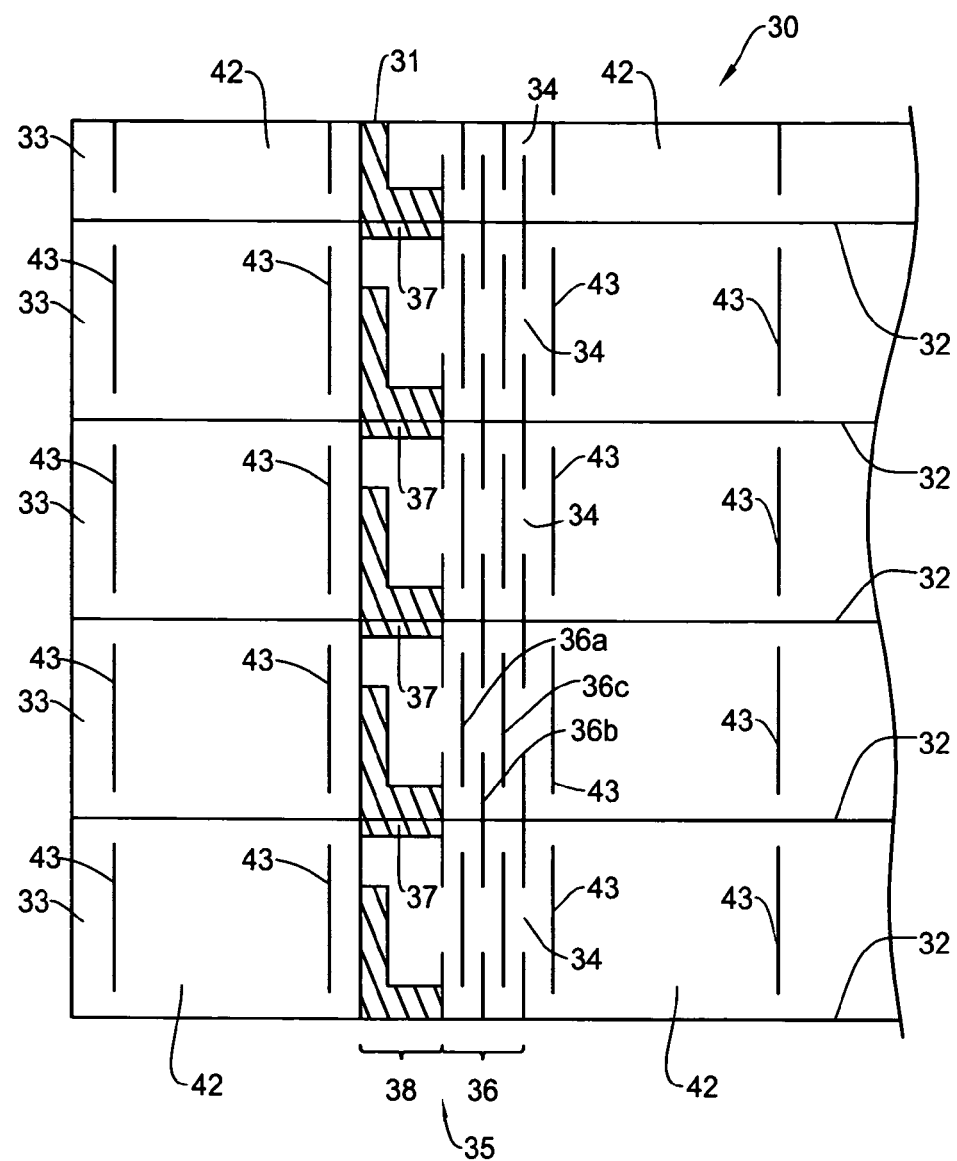
FIGS. 3A-3D show a basic concept of the check valve of the present invention where

The present invention is described in detail with reference to the accompanying drawings. FIGS. 3A-3D are plan views showing a structure of the check valve for an air-packing device (bubble wrapping sheet) and a basic structure of a bubble wrapping sheet in the present invention. FIG. 3A shows a structure of a check valve 35 and a portion of an bubble wrapping sheet 30. The bubble wrapping sheet 30 having the check valves 35 is comprised of two or more rows of air tubes (air containers) 33. Each row of air tubes 33 has a plurality of series connected air bubbles 42. Each air tube 33 is divided by bubble partition seals 43 to form a multiplicity of air bubbles 42 (show only two for each tube) as will be explained later in detail.

Figure 4:
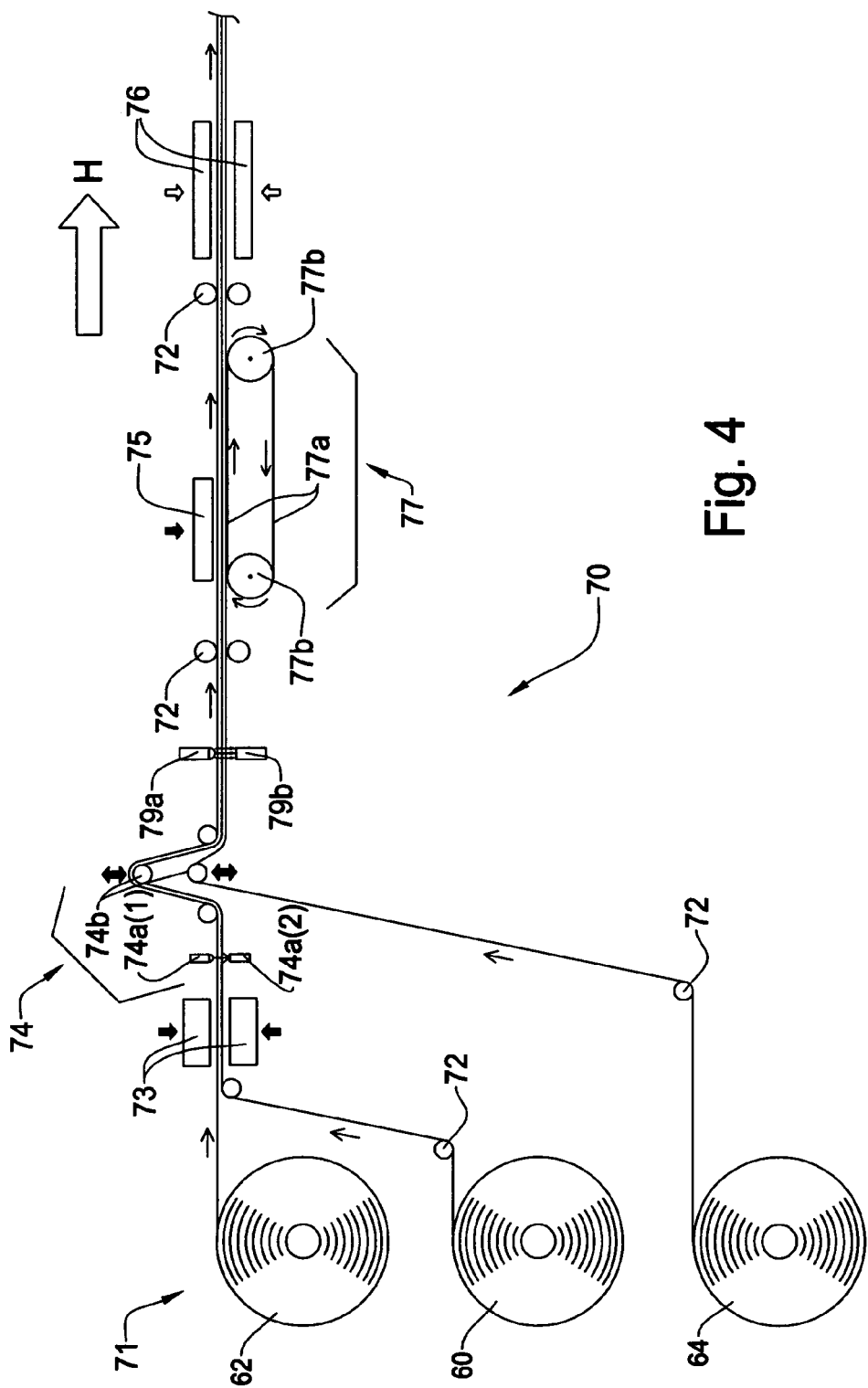
FIG. 4 is a schematic diagram showing an example of apparatus for producing the air-packing devices of the present invention.
Figure 5:
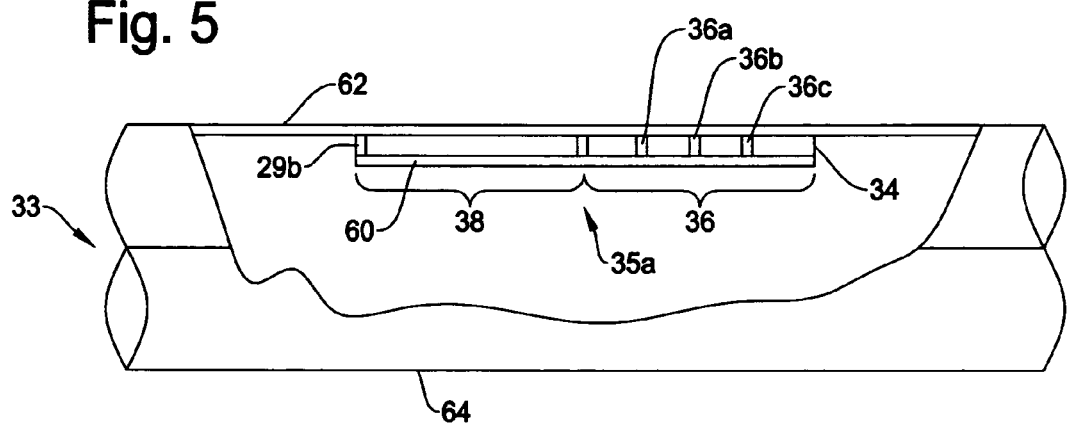
FIG. 5 is a cross sectional view showing an example of inner structure of the check valve in the present invention configured by a single layer film and formed on one of the thermoplastic films of the air-packing device.
Figure 6:
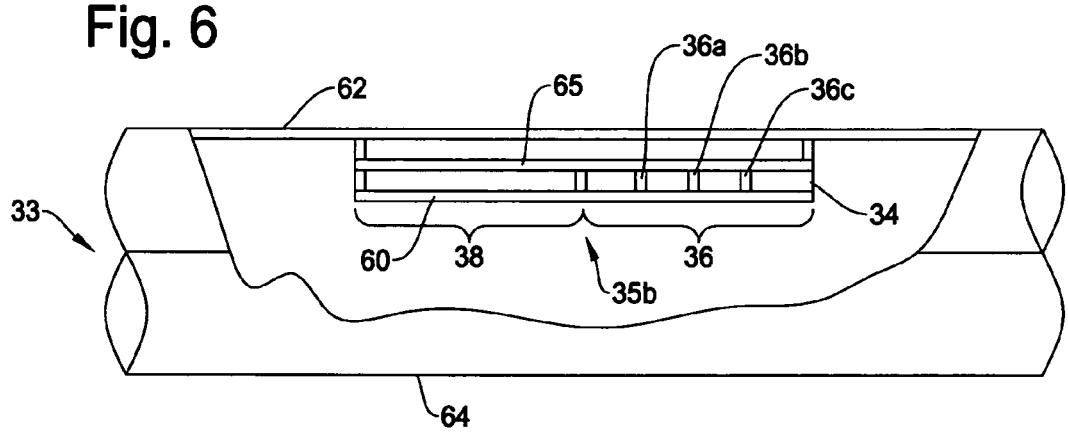
FIG. 6 is a cross sectional view showing another example of the inner structure of the check valve in the present invention configured by double layer films and formed on one of the thermoplastic films of the air-packing device.

Before supplying the air to inflate the bubble wrap, the bubble wrapping sheet 30 has a shape of an elongated rectangular sheet made of a first (upper) thermoplastic film 62 and a second (lower) thermoplastic film 64 (FIGS. 4-6). Air tubes each 33 having series connected air bubbles 42 are aligned in a parallel fashion so that the air bubbles 42 are arranged in matrix manner on the bubble wrapping sheet 30. To create such a structure, air tubes are formed by bonding the first thermoplastic film 62 and the second thermoplastic film 64 by the separation line (heat-seal line) 32.

Consequently, a plurality of air tubes 33 are created in parallel each having a plurality of series connected air bubbles 42. Each air tube 33 can be independently filled with the air through the check valve. Likewise, the first thermoplastic film 62 and the second thermoplastic film 64 are heat sealed at the bubble partition seals 43 so that the air bubbles 42 series connected with one another are created on each air tube 33. As shown, both ends of the separation seals 43 are spaced from the separation lines (side seal or tube partition seal) 32. This space provides enough passage of the air to pass through.

A check valve film 60 having a plurality of check valves 35 is attached to one of the thermoplastic films 62 and 64. When attaching the check valve film 60, peeling agents 37 shown by hatched lines are applied to the predetermined locations on the sealing lines 32 between the check valve sheet and one of the plastic films 62 and 64. The peeling agent 37 is, for example, a type of paint having high thermal resistance so that it prohibits the thermal bonding between the first and second thermoplastic films 62 and 64. Accordingly, even when the heat is applied to bond the first and second films along the heat-seal line (tube partition seal) 32, the first and second films will not adhere with each other at the location of the peeling agent 37.

The peeling agent 37 also allows the air input 31 to open easily when filling the air in the bubble wrap 30. When the upper and lower films 62 and 64 made of identical material are layered together, there is a tendency that both films stick with one another. The peeling agent 37 printed on the thermoplastic films prevents such sticking. Thus, it facilitates easy insertion of an air nozzle of the air compressor into the air input 31 of the bubble wrapping sheet 30 when inflating the bubble wrap sheet 30.

The check valve 35 of the present invention is configured by a common air duct portion 38 and an air flow maze portion 36. The air duct portion 38 acts as a duct to allow the flows of the air from the air input 31 to each set of air tubes 33. The air flow maze portion 36 prevents free flow of air between the bubble wrap sheet 30 and the outside, i.e., it works as a brake against the air flows. To achieve this brake function, the air flow maze portion 36 is configured by two or more walls (heat-seals) 36a-36c so that the air from the common air duct portion 38 will not straightly flow into the air tubes but have to flow in a zigzag manner. At the end of the air flow maze portion 36, an exit 34 is formed. By using a relatively complex configuration of the maze portion 36, the size of the check valve 35 can be reduced.

Figure 3B:
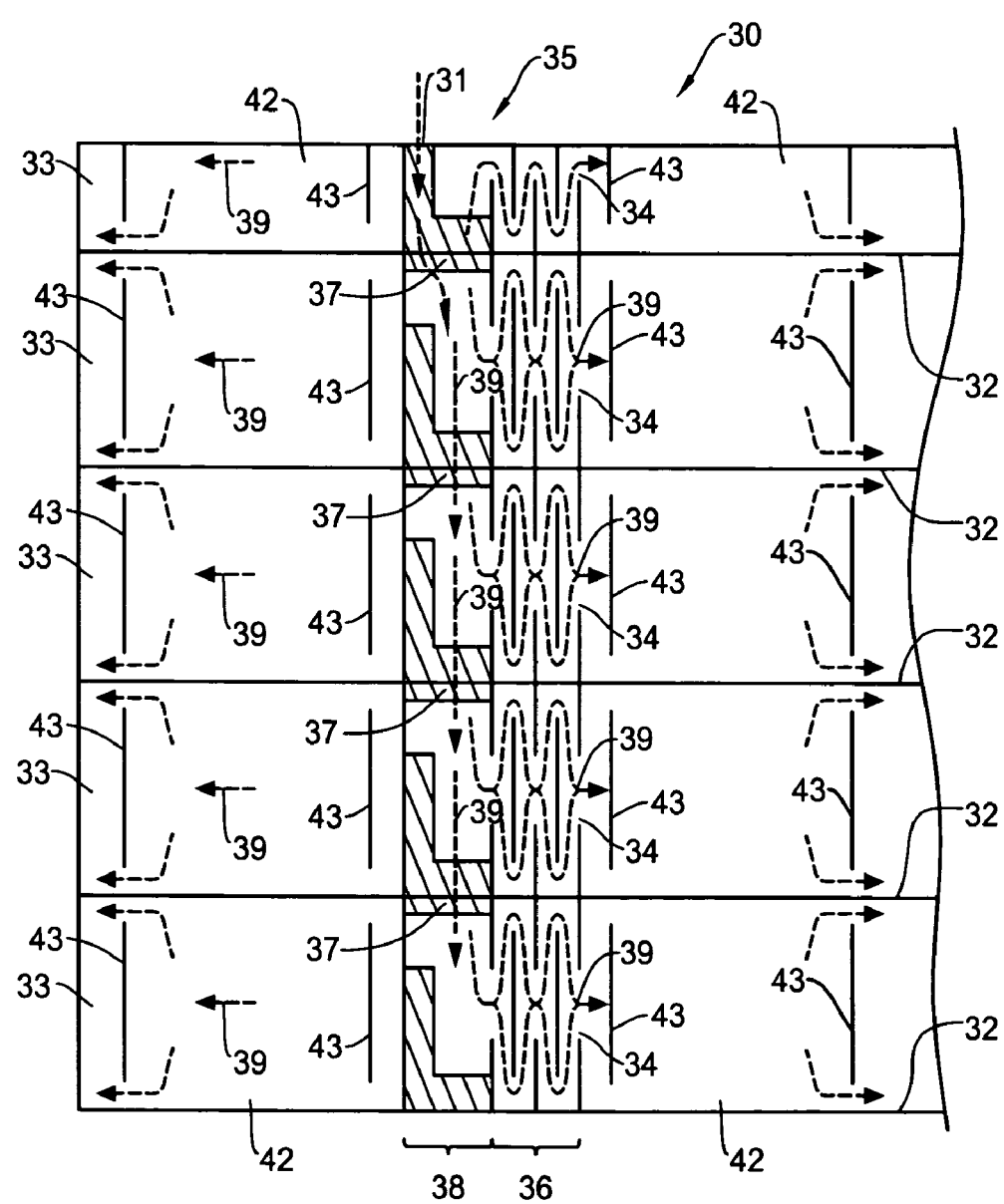

The bubble wrapping sheet 30 of the present invention incorporates the check valve 35 and the air tube 33 where each air tube 33 includes a series connected bubbles 42. In the bubble wrapping sheet 30, the compressed air supplied to the air input 31 to inflate the air tubes 33 with air bubbles 42 flows in a manner as illustrated in FIG. 3B. The plan view shown in FIG. 3B includes the structure of the check valve 35 identical to that of FIG. 3A and further includes dotted arrows 39 showing the flows of the air in the check valve 35 and the air tubes 33. As indicated by the arrows 39, the air from the check valve 35 flows both forward directions and backward direction of the bubble wrapping sheet 30.

Namely, when the air is supplied to the air input 31 from the air compressor (not shown), the air flows toward the exit 34 via air duct portion 38 and the air flow maze portion 36 as well as toward the next adjacent air tube 33 via the air duct portion 38. The air exited from the exit 34 inflates the air tube 33 by flowing both forward and backward directions (right and left directions of FIG. 3B) of the bubble wrapping sheet 30, thereby inflating the series connected air bubbles 42. The air moved to the next air tube flows in the same manner, i.e., toward the exit 34 and toward the next adjacent air tube 33. Such operations continues from the first air tube 33 to the last air tube 33. In other words, the air duct portion 38 allows the air to flow to either the present air tube 33 through the air flow maze portion 36 and to the next air tube 33.

Figure 3C:
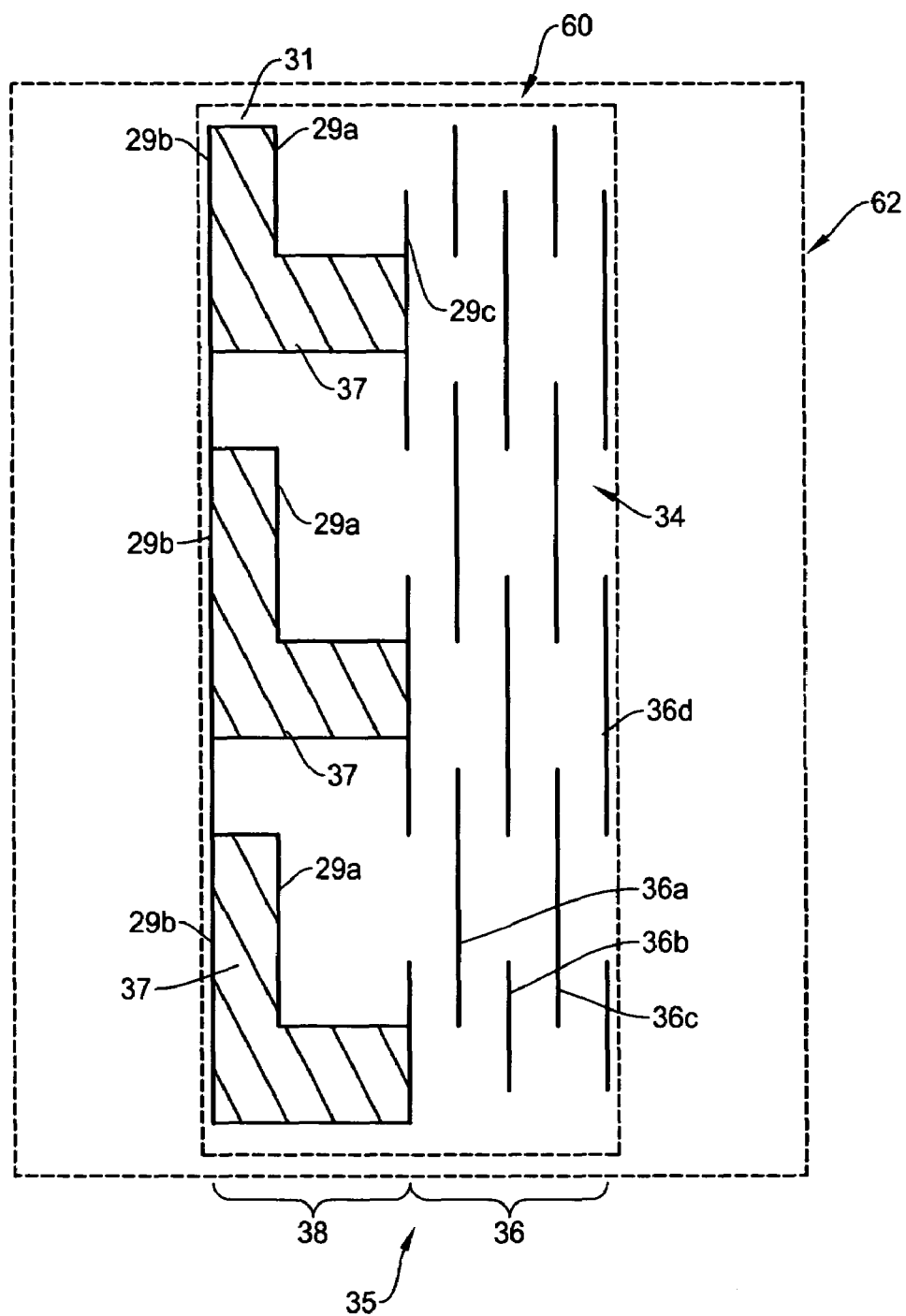
Figure 3D:
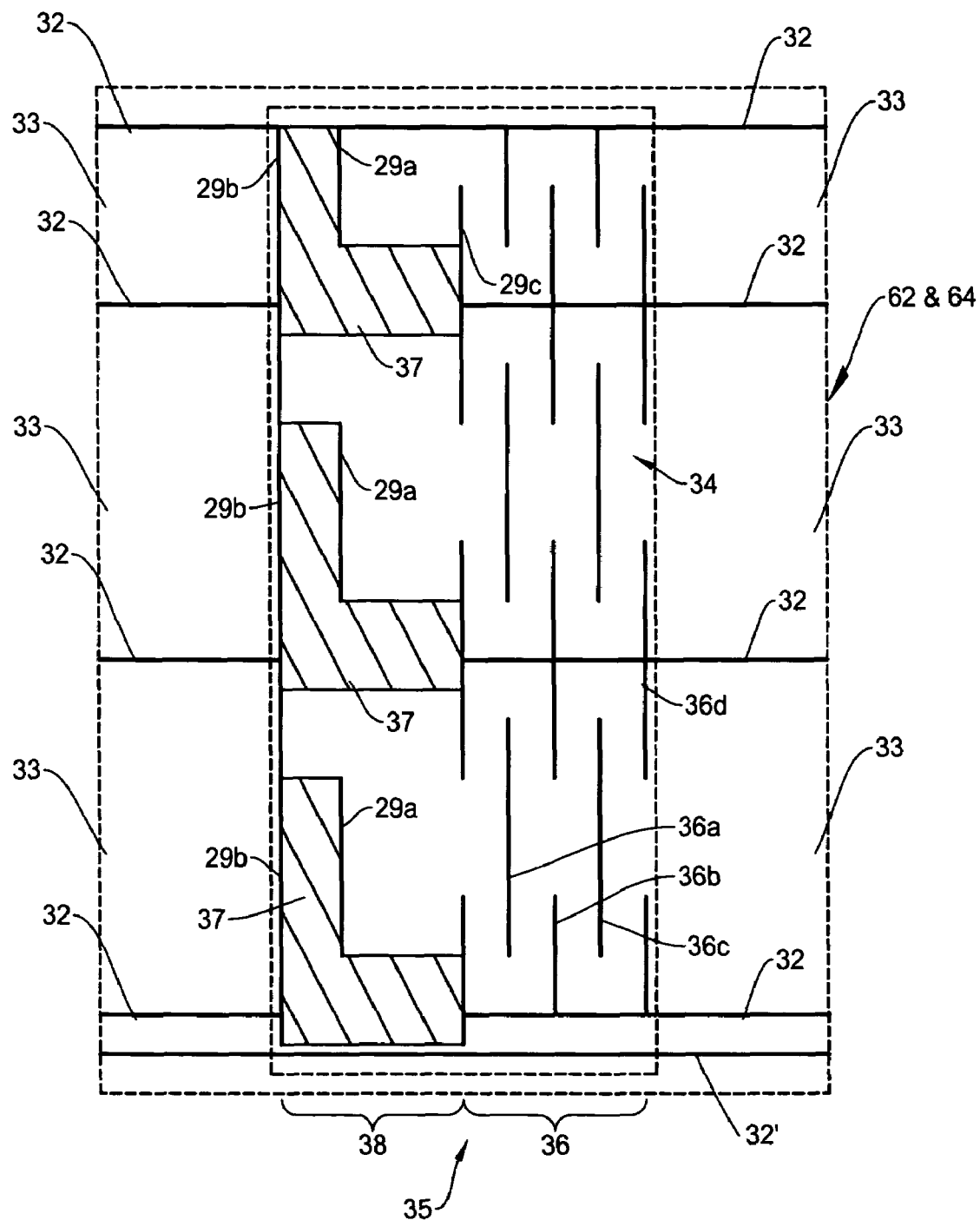

FIGS. 3C-3D show an enlarged view of the check valve of the present invention for explaining how the check valves 35 are created on the bubble wrapping sheet 30. As noted above, the check valve film 60 is attached to either one of the thermoplastic film 62 or 64 of the bubble wrapping sheet 30. The example of FIGS. 3C and 3*d* show the case where the check valve film 60 is attached to the upper (first) thermoplastic film 62. The thick lines in the drawings indicate the heat-seal (bonding) between the films.

The bubble wrapping sheet of the present invention is manufactured by bonding the second (lower) thermoplastic film 64, the check valve film 60, and the first (upper) thermoplastic film 62 by pressing the films with a heater. Since each film is made of thermoplastic material, they will bond (welded) together when heat is applied. In this example, the check valve film 60 is attached to the upper thermoplastic film 62, and then, the check valve film 60 and the upper thermoplastic film 62 are bonded to the lower thermoplastic film 64.

First, as shown in FIG. 3C, the check valve film 60 is attached to the upper thermoplastic film 62 by heat-sealing the two films at the portions indicated by the thick lines. Through this process, the peeling agents 37 applied in advance to the check valve film 60 is attached to the upper film 62 by the bonding lines 29a and 29b to create the air duct portions 38. Further, the air flow maze portions 36 are created by the bonding lines 36a-36c, etc. At the end of the maze portion 36, an air passage is opened to establish the air exit 34.

Then, as shown in FIG. 3D, the check valve film 60 and the upper thermoplastic film 62 are attached to the lower thermoplastic film 64 by heat-sealing the upper and lower films at the portions indicated by the thick lines (tube partition seal) 32. Through this process, each air tube 33 is separated from one another because the boundary between the two air cells is closed by the bonding line (tube partition seal) 32. However, the range of the bonding line 32 having the peeling agent 37 is not closed because the peeling agent prohibits the heat-sealing between the films. As a result, the air duct portion 38 is created which allows the air to flow in the manner shown in FIG. 3B. Although not shown in FIG. 3D, the series connected air bubbles 42 are also created by heat sealing the bubble partition seals 43 on each air tube 33 as shown in FIGS. 3A and 3B.

In the foregoing example, the peeling agent 37 on the check valve film 60 has a shape of letter "L" as shown in FIGS. 3A-3D. The advantage of this shape is that it allows a nozzle of an air source such as an air compressor to easily fit to an air input 31 to fill the air in the bubble wrapping sheet 30. Typically, the bubble wrapping sheet 30 is cut at the end of the production process of FIG. 4. For example, the air packing device may be cut in such a way that the vertical line of "L" shaped peeling agent 37 of the check valve 35 at the uppermost position of FIG. 3A can function as the air input. Thus, the L-shaped peeling agent 37 is suitable for establishing the air input 31 of appropriate size by the vertical line while achieving a sufficient size of the air duct portion 38 by the horizontal line. However, the peeling agent 37 can take various other forms to establish the check valve of the present invention.

FIG. 4 shows an example of a manufacturing apparatus for producing the bubble wrapping sheets 30 of the present invention incorporating the check valves. As noted above with reference to FIGS. 3C-3D, the check valves 35 are constructed during the manufacturing process of the bubble wrapping sheets. The structure of the manufacturing apparatus of FIG. 4 is just an example, and an ordinary skilled person in the art appreciates that there are many other ways of forming an apparatus for producing the bubble wraps with use of the concept of the apparatus of FIG. 4. For example, another production system used by the assignee of this invention is shown in FIGS. 18A and 18B as will be briefly described later.

The manufacturing (production) apparatus 70 in FIG. 4 is comprised of a film feeding means 71, film conveying rollers 72, a valve heat-seal device 73, an up-down roller controller 74, a sensor 79 for feeding elongated plastic films, a main film heat-seal device 75, a belt conveyer 77 for the main heat-seal operation, and a supplemental heat-seal device 76. In the case where the main heat-seal device 75 is capable of heat-sealing all of the necessary portions of the upper and lower films 62 and 64, the supplemental heat-seal device 76 will be omitted.

The up-down roller controller 74 is provided to the manufacturing apparatus 70 in order to improve a positioning performance of the check valves. The up-down roller controller 74 moves the rollers 74b in perpendicular (upward or downward) to the manufacturing flow direction H in order to precisely adjust a position of the check valve film 60. Also, the belt conveyer 77 having a plastic film with high mechanical strength at high temperature such as a Teflon film or a Mylar film on its surface is provided to the manufacturing apparatus 70 in order to improve a heat seal performance.

With reference to FIG. 4, an overall manufacturing process is described. First, the film feeding means 71 supplies the upper thermoplastic film 62, the lower thermoplastic film 64, and the check valve film 60. The film conveying rollers 72 at various positions in the manufacturing apparatus 70 guide and send the upper thermoplastic film 62, the lower thermoplastic film 64, and the check valve film 60 forward.

The first stage of the heat-sealing process is conducted by the valve heat-seal device 73. This is the process for forming the check valves 35 by attaching the check valve film 60 to the upper thermoplastic film 62. The position of each film is precisely adjusted by the up-down roller controller 74 based on the signals from the sensor 79. During this process, the check valve film 60 is bonded to the upper thermoplastic film 62 with the patterns (bonding lines) illustrated by the thick lines of FIG. 3C.

The second stage of the heat-sealing process is conducted by the main heat-seal device 75 and the belt conveyer 77. The main heat-seal device 75 is a heater for bonding the upper and lower thermoplastic films for creating many air tubes 33 and air bubbles 42 with the bonding lines 32 and partition seals 43 illustrated by the lines of FIGS. 3A and 3B. Typically, the main heat-seal device 75 is a large scale heater to create the sheets of bubble wrapping sheet 30 such as shown in FIGS. 10A-10G and 11-13. During this process or by a separate process, the bubble partitions seals 43 are also created by bonding the upper and lower thermoplastic films to create air bubbles 42 in series in each of the air tubes 33.

The belt conveyer 77 is used to prevent the heat-sealed portions from extending or broken by the main heat-seal device 75. The belt conveyer 77 has two wheels 77b and a belt 77a made of or a coated by a high heat resistance film such as a Mylar film or a Teflon film. In the heat-seal process, the heat from the main heat-seal device 75 is applied to the upper and lower films 62 and 64 through the Teflon film on the conveyer belt 77a. The Teflon film may temporarily stick to one of the upper/lower films 62 and 64 immediately after the heat-seal process. If the Teflon film is immediately separated from the upper/lower films 62 and 64, the heat-sealed portions of the upper/lower films may be deformed or even broken.

Thus, in the manufacturing apparatus of FIG. 4, without immediately separating Teflon film from the upper and lower films 62 and 64, the Teflon film moves at the same feed speed of the upper and lower films 62 and 64 because of the belt conveyer 77. During this time, the heat seal portions with a high temperature are naturally cured while they are temporally stuck to the Teflon film on the belt 77a. Thus, the upper and lower films 62 and 64 can be securely separated from the Teflon film at the end of the belt conveyer 77.

The third stage of the sealing process is performed by the supplemental seal device 76. This is the final heat-seal process to produce the bubble wrapping sheet by heat-sealing the remaining heat-seal portions. In the case where the main heat-seal device 75 is able to heat-seal all of the necessary portions, the process by the supplemental seal device 76 is unnecessary. The bubble wrapping sheet produced in the form of one long film may be cut and folded or rolled to be transferred to the user.

FIG. 5 is a partial cross sectional front view showing an example of inner structure of the check valve of the present invention configured by a single layer film and formed on a thermoplastic film of the bubble wrapping sheet where only one air tube 33 of the bubble wrapping sheet is illustrated. As described in the foregoing, the common air duct portion 38 and the air flow maze portion 36 are created between the check valve film 60 and one of the upper and lower thermoplastic films 62 and 64 of the bubble wrapping sheet. In this example, the check valve film 60 is attached to the upper thermoplastic film 62 through the heat-sealing in the manner described with reference to FIG. 3C.

The air flow maze portion 36 has a maze structure such as a zig-zaged air passage to cause resistance to the air flow such as reverse flow. Such a zig-zaged air passage is created by the bonding (heat-sealed) lines 36a-36c. Unlike the straight forward air passage, the maze portion 36 achieves an easy operation for inflating the bubble wrapping sheet by the compressed air. Various ways for producing the resistance of the air flow are possible, and the structure of the maze portion 36 shown in FIGS. 3A-3D and 5 is merely one example. In general, the more complex the maze structure, the less area of the maze portion 36 is necessary to adequately produce the resistance against the air flow, i.e, decrease the size of the check valve.

FIG. 6 is a cross sectional view showing another example of the inner structure of the check valve in the present invention configured by double layer films and formed on one of the thermoplastic films of the bubble wrapping sheet where only one air tube 33 of the bubble wrapping sheet is illustrated. In this example, an addition film 65 is provided between the upper thermoplastic film 62 and the check valve film 60. The additional film 65 and the check valve film 60 forms the check valves 35b. The additional film 65 is so attached to the upper film 62 that the space between the upper thermoplastic film 62 and the additional film 65 will not transmit air.

The advantage of this structure of FIG. 6 is the improved reliability in preventing the reverse flows of air. Namely, in the check valve of FIG. 5, when the air is filled in the air cell tube 33, the upper film 62 of the air tube having the check valve 35 is curved. Further, when a product is wrapped by the bubble wrapping sheet, the surface projection of the product may contact and deform the outer surface of the air tube (air bubble) having the check valve therein. The sealing effect created by the check valve can be weakened because of the curvature of the air tube. The additional film 65 mitigates this problem since the film 65 itself is independent from the upper film 62.

Figure 7A:
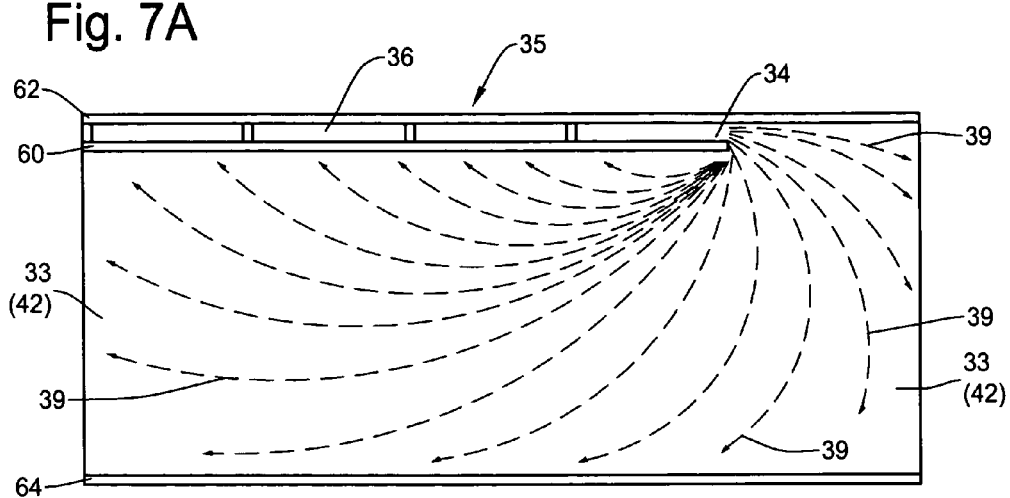
FIG. 7A is a cross sectional view showing the inner structure of a check valve of the present invention and air flows in the air cells of the air-packing device when inflating the same.
Figure 7B:
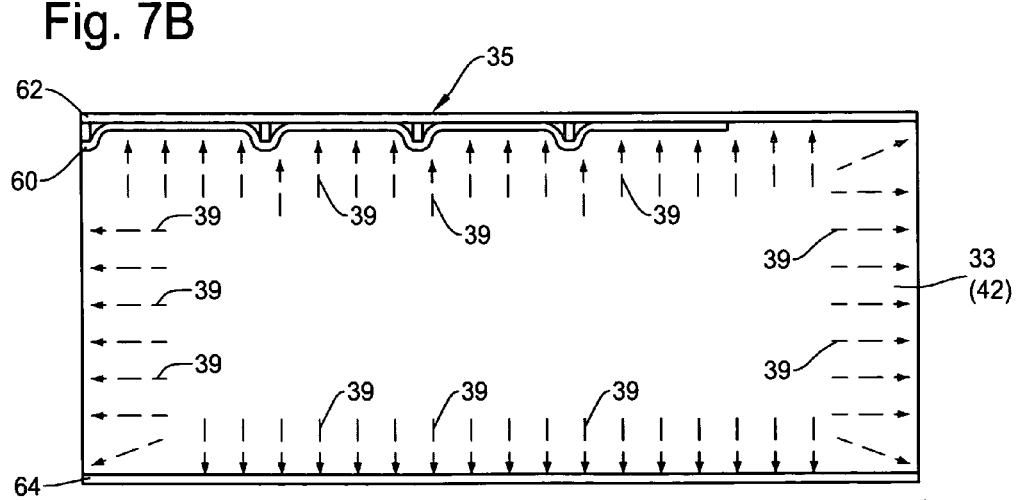
FIG. 7B is a cross section view showing the inner structure of a check valve and the air flows where the air-packing device is fully inflated so that the check valve is closed by the air pressure.

FIGS. 7A and 7B are cross sectional views showing the inside of the air tube 33 (air bubble 42) having the check valve 35. FIG. 7A shows the condition wherein the compressed air is being introduced into the air tube 33 through the check valve 35. FIG. 7B shows the condition where the air tube 33 is filled with air to an appropriate degree so that the check valve 35 is effectively sealed by the inside air pressure. The dotted arrows 39 indicate the flow of air in FIGS. 7A and 7B.

As shown in FIG. 7A, when the air is pumped in from the air input 31 (FIGS. 3A-3B), the air will flow toward each air tube 33 having series connected air bubbles 42. While a part of the air flows toward the next row of air tube 33, the remaining air goes into the present air tube to inflate the air bubbles.

The air will flow into the air tube (air bubbles) due to the pressure applied from the air source such as an air compressor. The air goes through the air flow maze portion 36 and exits from the exit 34 at the end of the maze portion 36. All of the air tubes and air bubbles will eventually be filled with the compressed air.

As shown in FIG. 7B, when the air bubble having the check valve 35 is inflated to a certain extent, the inner pressure of the air will push the check valve film 60 upward so that it touches the upper thermoplastic film 62. FIG. 7B mainly shows the air flow maze portion 36 of the check valve 35 to show how the check valve works. When the inner pressure reaches a sufficient level, the check valve film 60 air-tightly touches the upper thermoplastic film 62, i.e., the check valve 35 is closed, thereby preventing the reverse flows of the air.

Figure 8A:
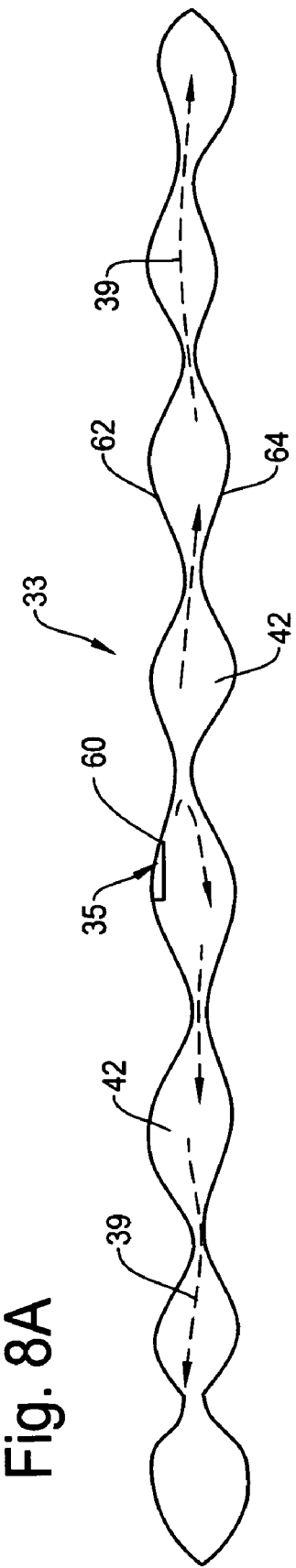
FIG. 8A is a cross sectional view showing an example of inner structure of the air-packing device of the present invention and the air flows therein when inflating the air-packing device.
Figure 8B:
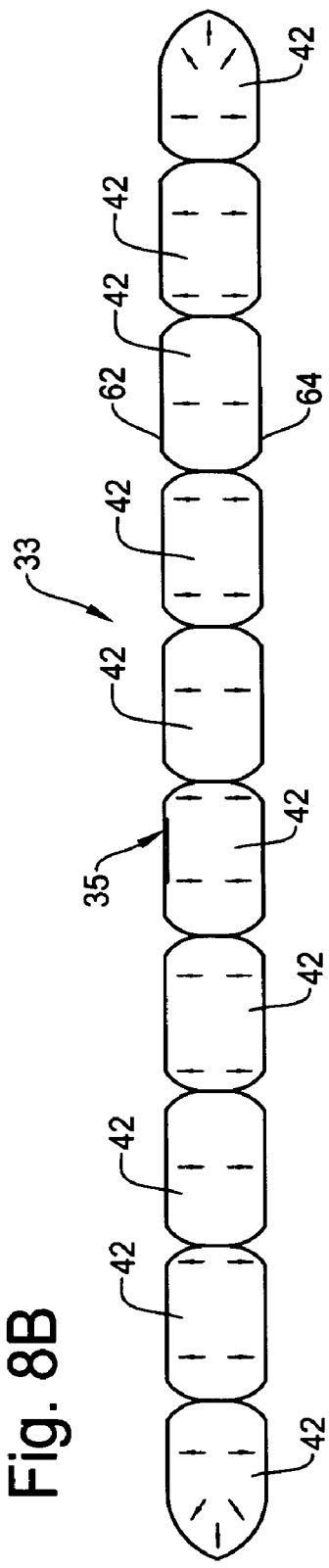
FIG. 8B is a cross sectional view showing the inner structure of the air-packing device of the present invention and the air flows therein where the air-packing device is fully inflated so that the check valve is closed by the air pressure.

FIG. 8A and FIG. 8B show an example of one entire air tube in a bubble wrapping sheet having a plurality of air bubbles 42 and the check valve 35 of the present invention when the compressed air is supplied thereto. FIG. 8A shows the condition where the air is not sufficiently filled in the air bubbles 42, thus, the air is continuously supplied to the air bubbles 42. When the air is sufficiently filled in the air bubble 42, the check valve 35 is pressed upwardly and firmly contact with the thermoplastic film 62 as shown in FIG. 8B, thereby closing the check valve 35 to prevent reverse flow. Because the check valve 35 is formed in a very small area as explained above, the check valve in the present invention provides much freedom on positioning on the bubble wrapping sheet.

Figure 9:
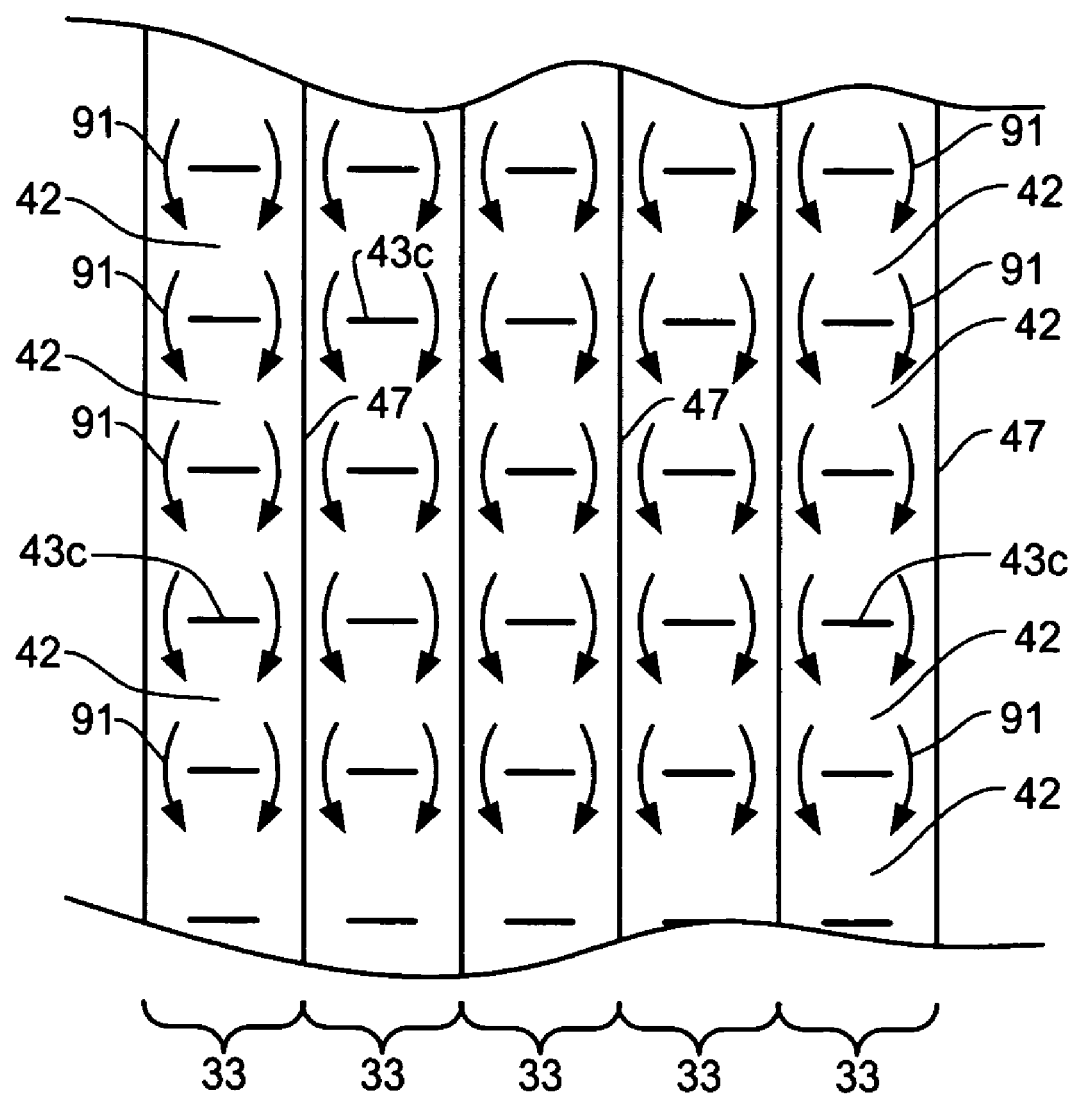
FIG. 9 is a partial plan view showing an air-packing device of the present invention which is an uninflated bubble wrapping sheet wherein the seals in each air passage form air bubbles and arrows indicate the flow of air when inflating the bubble wrapping sheet.

The above description mainly described the structure of the check valve. Next, the structure of the air bubbles to contain the compressed air is explained in detail with reference to the accompanying drawings. FIG. 9 shows an example of the structure of a part of the bubble wrapping sheet in the present invention when it is not inflated. The arrows 91 indicate the flow of air when the air is injected to inflate the bubble wrapping sheet. Heat seals (tube partition seals) 47 separate the air tubes 33 from one anther and bubble partition seals 43c create air bubbles 42 on each air tube 33 on the bubble wrapping sheet.

For simplicity of illustration, the check valves as described in the foregoing are not shown in FIG. 9. The air bubbles 42 are formed by bubble partition seals 43c. As noted above, the seals (side seal or tube separation seal) 47 establish an elongated air tubes 33 on the bubble wrapping sheet. The bubble partition seals 43c are aligned in each of the air tube tubes to create the series connected air bubbles 42 for each air tube 33. The bubble partition seals 43c is shorter than the width between the adjacent seals 47. Thus, there is a small opening between the ends of the bubble partition seals 43 and their adjacent seals 47. This space allows the air to flow to each air bubble 42 as indicated by arrow 91. By adjusting the length of the bubble partition seals 43c, the spaces through which the air passes can be adjusted.

Since each air bubble 42 is formed by the side seals 47 and bubble partition seals 43c, the air bubble 42 can be formed with relatively simple configuration. Thus, designing and production of the bubble wrapping sheet in the present invention can be easily performed. Moreover, the bubble wrapping sheet of the present invention can be manufactured with little modification of manufacturing apparatus such as shown in FIG. 4. Although only a part of the bubble wrapping sheet is shown, the size and shape of the bubble wrapping sheet can be easily modified to accommodate intended purposes.

Figure 10A:
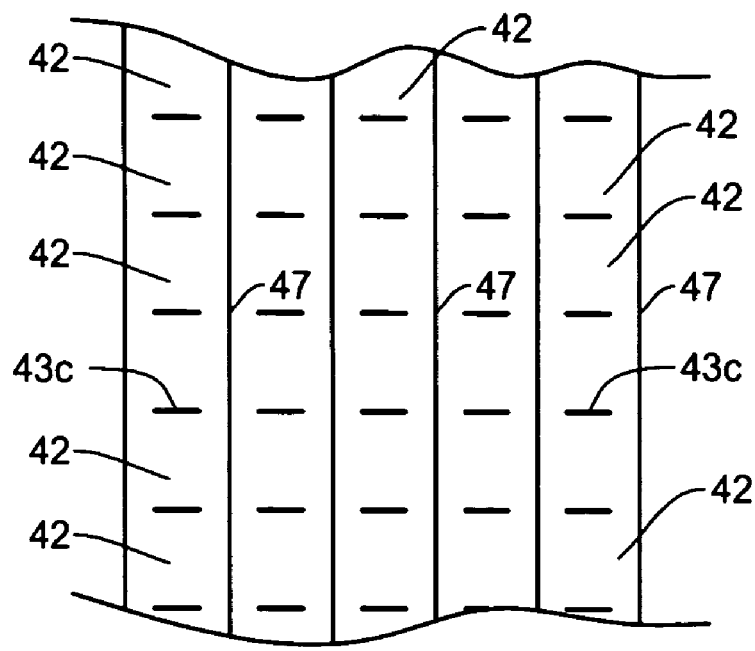
FIGS. 10A to 10G are partial plan views showing examples of structure of the air-packing device with various configurations of heat seals to change the shape of air bubbles and density of air bubbles on the bubble wrapping sheet in accordance with the present invention.
Figure 10B:
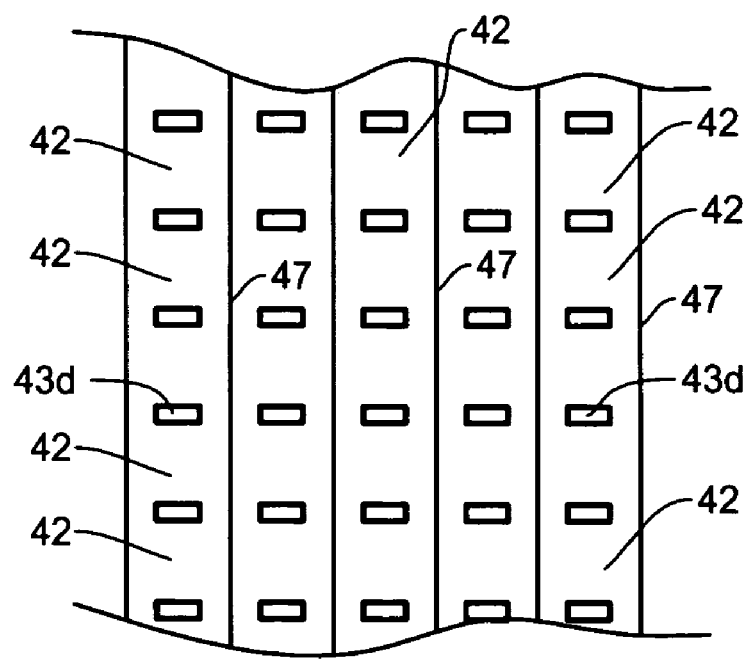

FIGS. 10A to 10G show other examples of the bubble wrapping sheet in the present invention in which side seals (tube partition seals) 47 and bubble partition seals 43 are modified. FIG. 10A is a plan view showing the bubble wrapping sheet in the present invention. This construction is identical to that shown in FIG. 9 described above. FIG. 10B shows another bubble wrapping sheet where the bubble partition seal 43d is wider than the bubble partition seal 43c in FIG. 10A. The configuration in FIG. 10B allows each air bubble 42 to be formed apart due to the width of the bubble partition seal 43d, i.e., the air bubbles 42 are more sparsely located. The width of the bubble partition bubble partition seals 43d in FIG. 10B is merely an example, and it may take other rectangular shape of square shape.

Figure 10C:
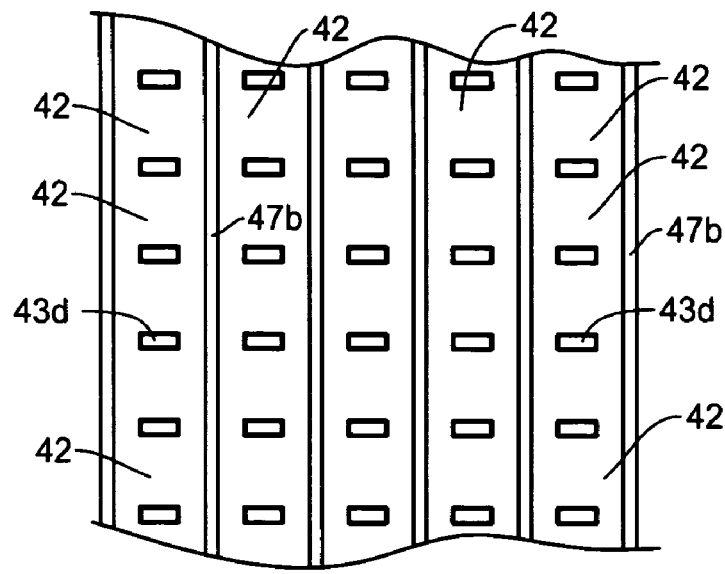

FIG. 10C is a plan view showing the bubble wrapping sheet in the present invention where the side seal (tube partition seal) 47b is wider than the side seal 47 in previous examples. This configuration also has the effect of sparsely locating the air tubes and air bubbles from one another. It is also possible to make the distribution of air bubbles much more sparse by thickening the tube partition seals 47 and the bubble partition seals 43.

Figure 10D:
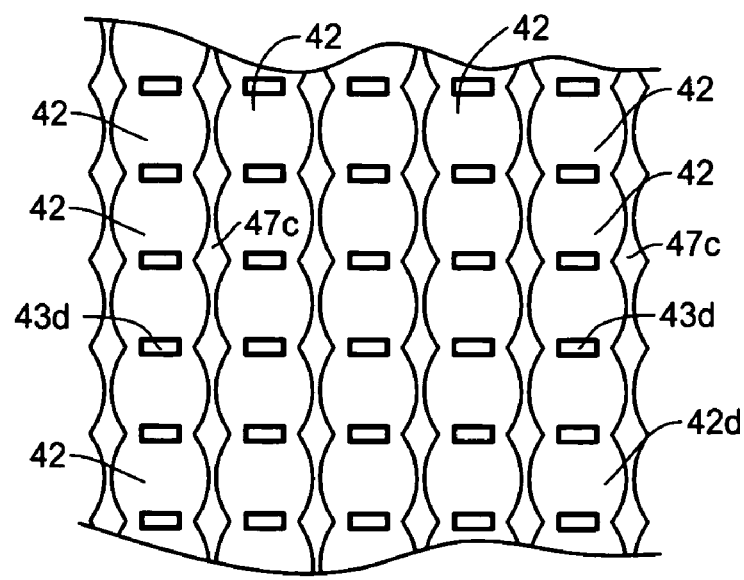

FIG. 10D shows a further example of bubble wrapping sheet in the present invention where the side (tube partition) seal 47c is has a wavy shape in such a way that the air bubbles 42 become more rounded than those in the previous examples. In this example, the air bubbles 42 is more circular than the air bubbles in previous examples because the tube partition seal 47 is curved in a manner to surround each air bubble 42.

Figure 10E:
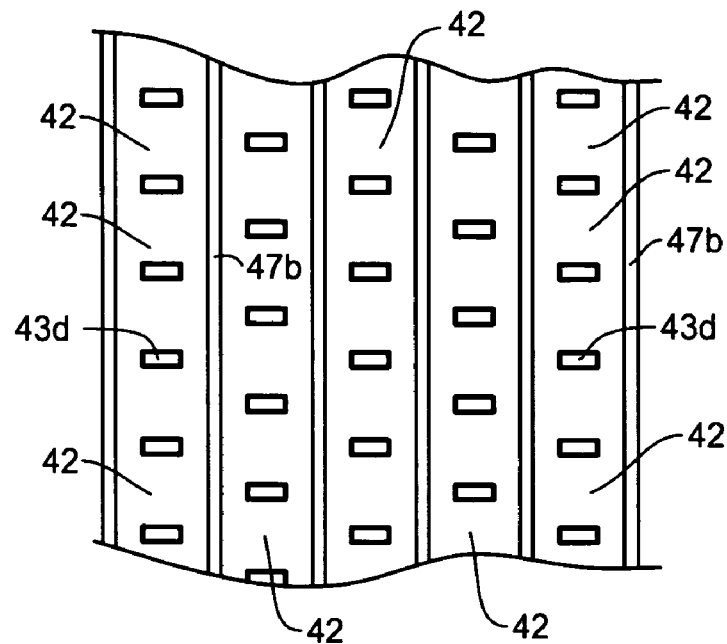

The bubble wrapping sheet in the present invention may form air bubbles that are not aligned with each other. FIG. 10E is a plan view showing such a configuration of the bubble wrapping sheet in the present invention where bubble partition seals 43d in the air tube are not identically aligned with bubble partition seals 43d in the adjacent air tube in the direction of X-axis (left and right). When the bubble wrapping sheet in FIG. 10E is inflated, air bubbles 42 are not aligned with one another.

Figure 10F:
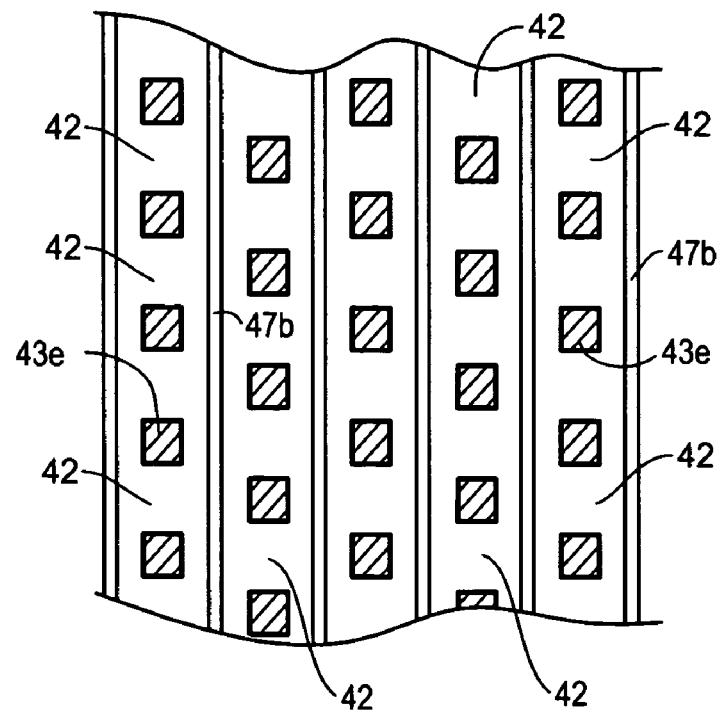
Figure 10G:
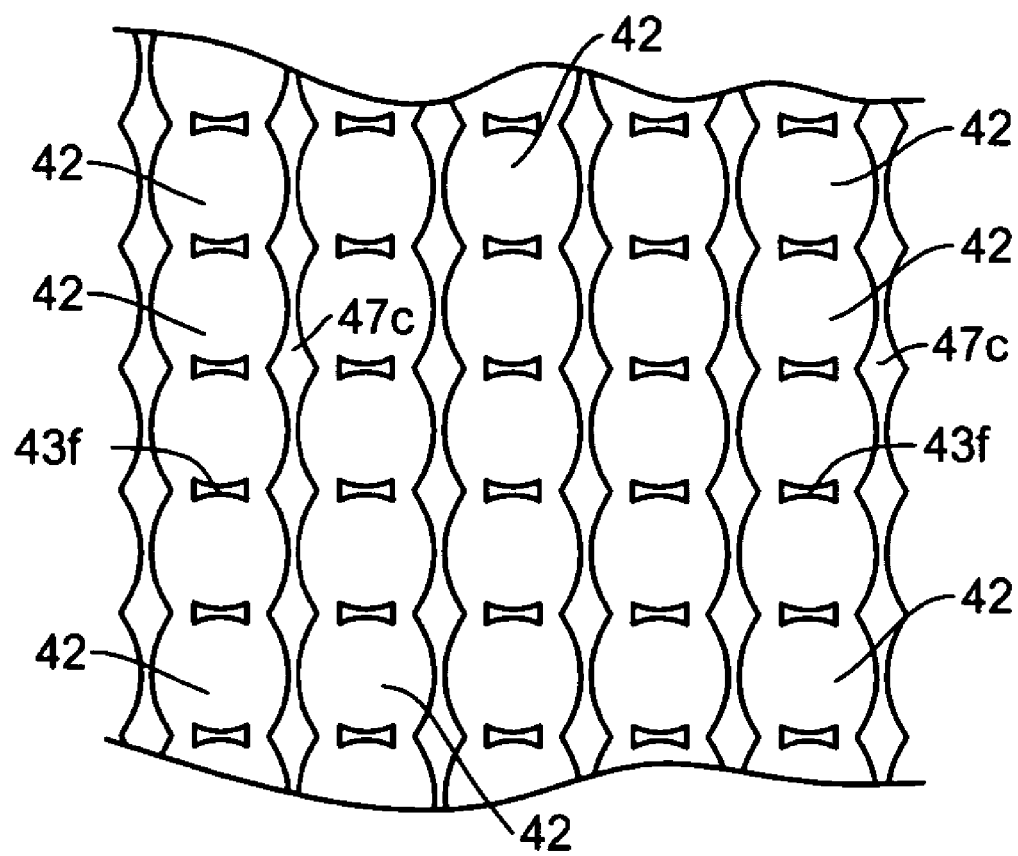

FIG. 10F is a plan view showing the configuration of the bubble wrapping sheet in the present invention where the bubble partition seals 43e have a size larger than that of the bubble partition seals 43d in FIG. 10E. This configuration also has the effect of decreasing the density in forming the air bubbles by increasing the space between the air bubbles. The shape of the bubble partition seals 43 may also be modified to alter the shape of the air bubbles. As shown in the alternative embodiment example in FIG. 10G, the bubble partition seals 43e may be curved inwardly at both sides to create air bubbles of more circular shape.

As described above, the present invention enables the bubble wrapping sheets to easily change the shape and size of the air bubbles by minor modification in the side seals and bubble partition seals. In most cases, the density of the air bubbles can be adjusted by simply changing the width of the bubble partition seals 43 and the side seals 47 as described above.

Figure 11:
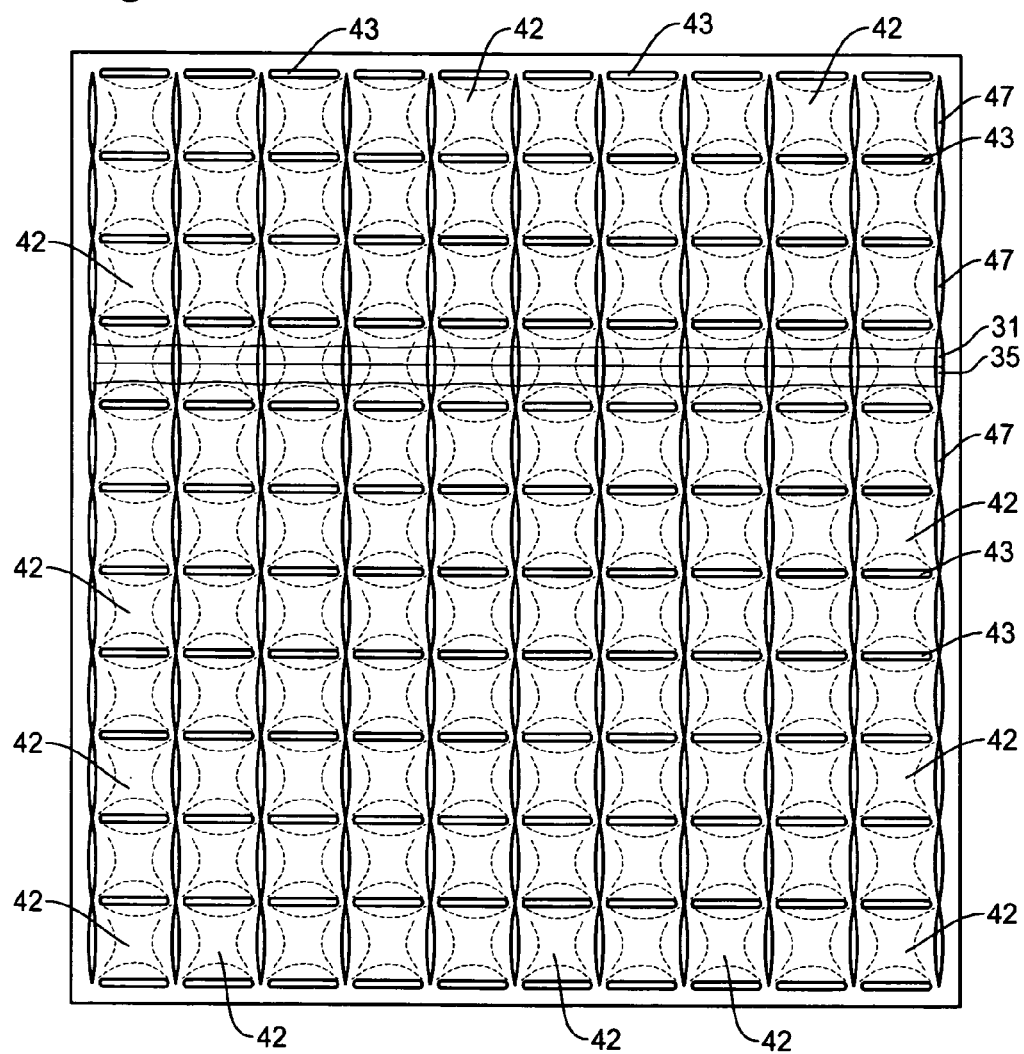
FIG. 11 is a plan view showing an example of air-packing device of the present invention applied to a bubble wrapping sheet.
Figure 12:
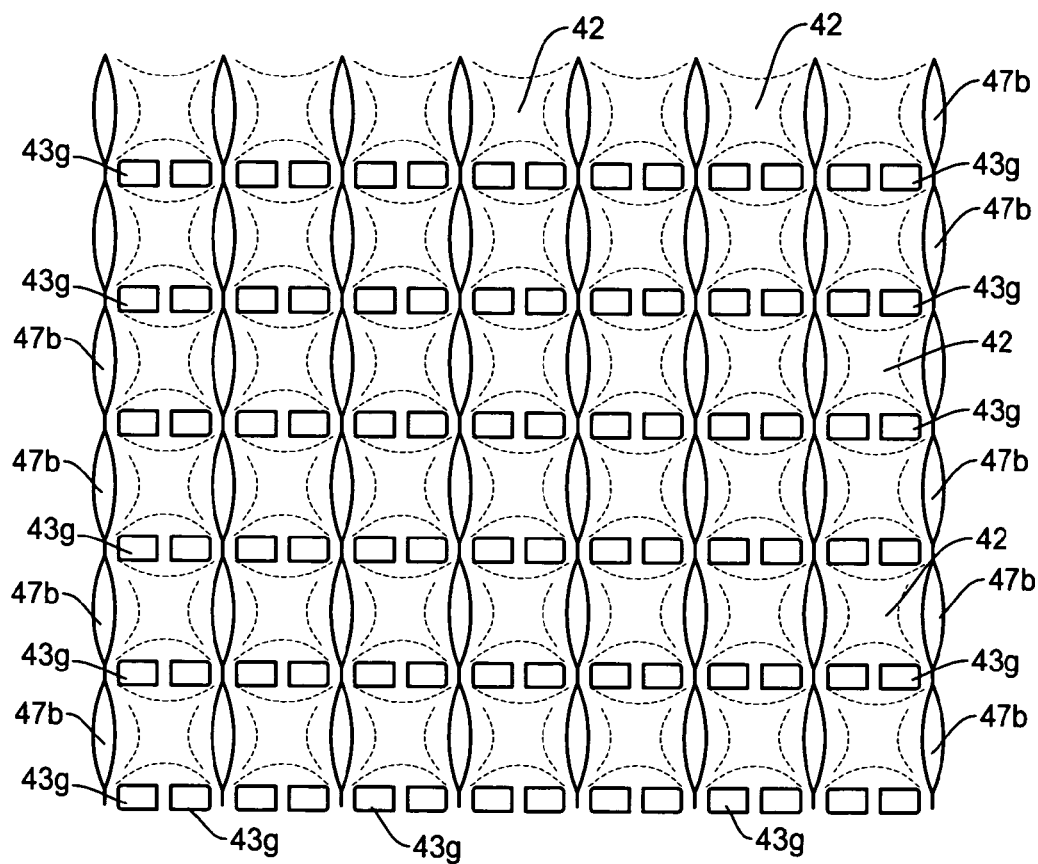
FIG. 12 is a plan view showing a part of another example of air-packing device of the present invention applied to a bubble wrapping sheet.
Figure 13:
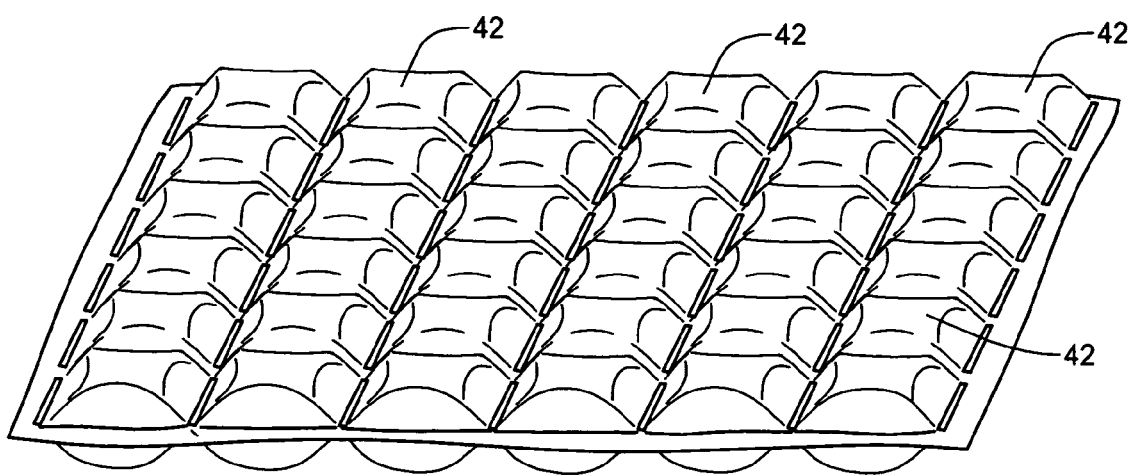
FIG. 13 is a perspective view showing an example of inflated bubble wrapping sheet based on the air-packing device of the present invention.

The FIG. 11 is a plan view showing the inflated bubble wrapping sheet in the present invention. This inflated bubble wrapping sheet is obtained by inflating the bubble wrapping sheet such as shown in FIG. 9. When each air bubble 42 is inflated, small deformation occurs such that each air bubble becomes more rounded due to the air pressure. FIG. 13 shows a perspective view of the inflated bubble wrapping sheet. Since the compressed air is injected into the each air tube, the air bubbles 42 are inflated. The inflated air bubbles provide shock-resistant property to a package to be protected.

Figure 14A:
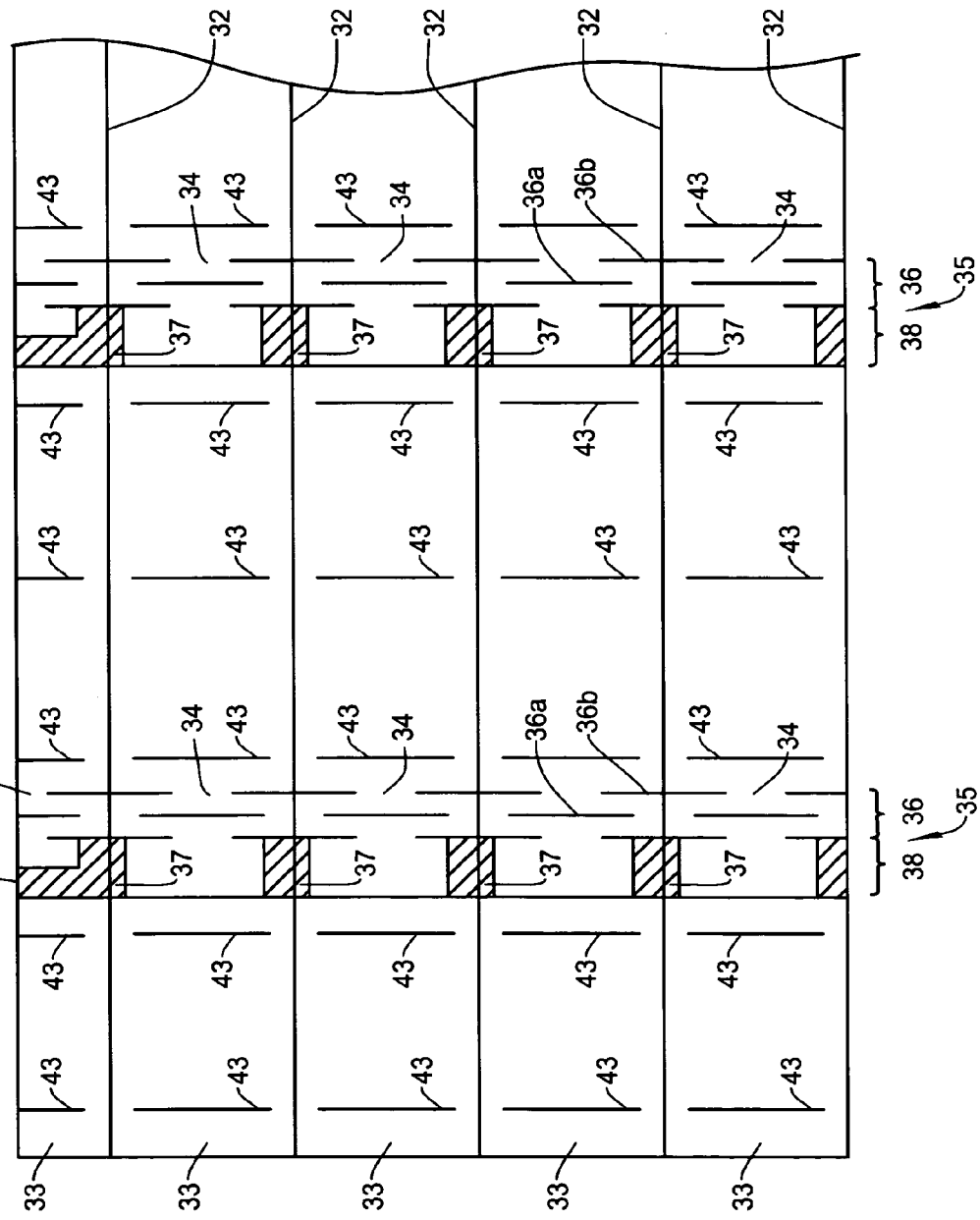
FIG. 14A is a plan view showing another embodiment of bubble wrapping sheet that includes two or more sets of check valves.

FIG. 14A shows another embodiment example of a bubble wrapping sheet in the present invention. In this example, two sets of check valve 35 are used where each set has a multiplicity of check valves 35. The air flow maze portion 36 of each check valve 35 can be more simplified than that shown in FIGS. 3A-3D so that a size of the check valve 35 can be minimized. Then, the air will flow in a manner similar that described with reference to FIG. 3B. The air is supplied through the openings (air input) 31 of each set of the check valves 35. Since two or more sets of the check valves 35 are incorporated, once the compressed air is filled, the bubble wrapping sheet reliably maintain the compressed air therein even though each of the check valves 35 has a small and simplified shape.

FIG. 14B shows a further example of a bubble wrapping sheet in the present invention. In this example, further to the structure of FIG. 14A, the bubble wrapping sheet has a master check valve 41 which is a check valve common to all of the air tubes 33 on the bubble wrapping sheet. The master check valve 41 may be a conventional check valve or a check valve made of layers of films in the present invention as described in the foregoing. Similar to the example of FIG. 14A, two sets of check valve 35 are used where each set has a multiplicity of check valves 35. The air is supplied through the master check valve 41, and will reach the openings (air input) 31 of each set of the check valves 35. Then, the air will flow in a manner similar that described with reference to FIG. 3B. This configuration allows high durability since the master check valve 41 reinforces the bubble wrapping sheet to prevent from the air leakage. That is, even if one of the check valves 35 fails for any reason, the master check valve 41 prevents reverse flow of air.

Figure 15:
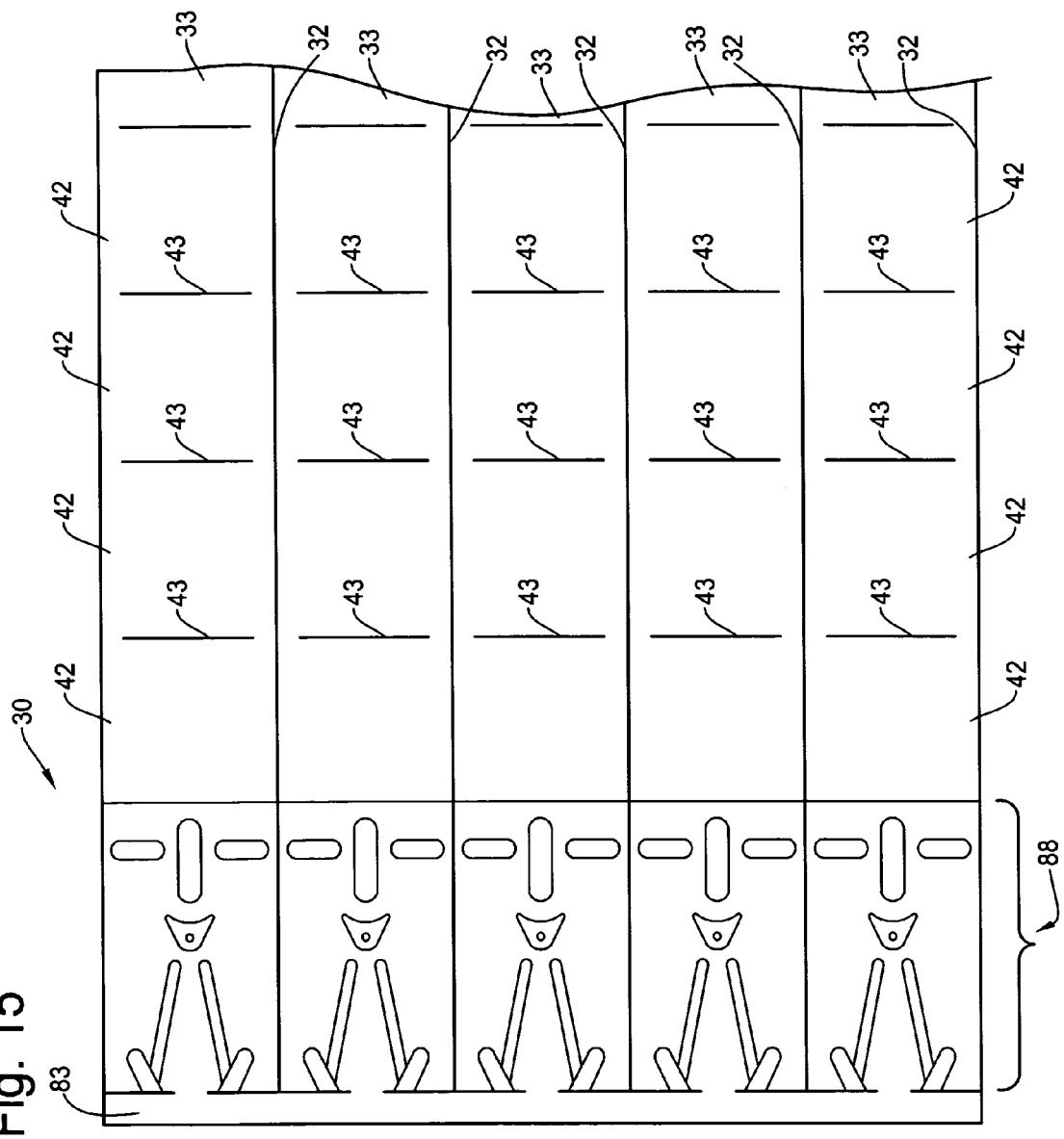
FIG. 15 is a plan view showing another embodiment example of an uninflated bubble wrapping sheet that incorporates check valves of a type different from that of FIGS. 3A-3D and FIG. 14.

FIG. 15 shows a further example of bubble wrapping sheet in the present invention incorporating an alternative check valve that is described in more detail with reference to FIGS. 16A, 16B and 17. A set of check valves 88 is formed at one end of the each air tube 33 on the bubble wrapping sheet. Each air tube 33 has a series connected air bubbles 42. An air guide 83 is commonly connected to the check valves 88 to supply the compressed air to the air bubbles 42 of each air tube 33.

Figures 16A, 16B:
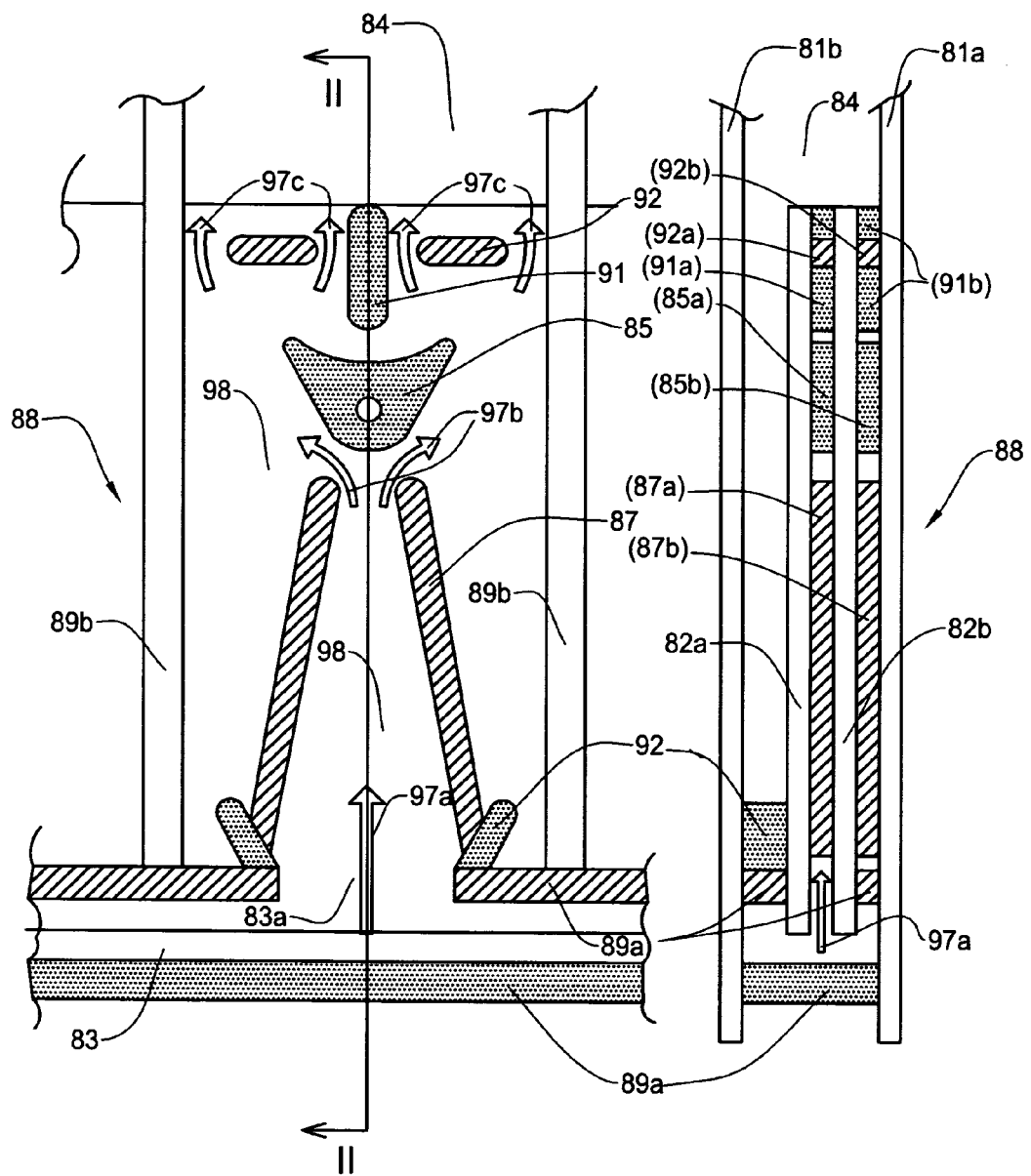
FIGS. 16A-16B are schematic diagrams showing an example of a detailed structure of the check-valve that is used in the bubble wrapping sheet of FIG. 15 in accordance with the present invention.

FIGS. 16A and 16B show the structure of the check valve 88 used in the example of FIG. 15. FIG. 16A is a top view and FIG. 16B is a cross sectional view of the check valve 88. FIG. 16B shows the cross sectional view of the check valve 88 taken along the line II in FIG. 16A. Further, the cross sectional view of FIG. 16B shows the case where the compressed air is not supplied to the air tube 84 of the bubble wrapping sheet.

In FIGS. 16A and 16B, reinforcing seal portions 92 are formed near the check valve inlet 83a such as shown in FIG. 16A. These portions are placed in a manner of contacting each edge of an inlet portion 83a such as shown in FIG. 16A. Seal portions 92 reinforce a boundary between an air guide passage 83 and an air tube 84, and prevent the air tube 84 from a rupture when it is inflated. In the present invention, the reinforcing seal portions 92 is not essential and can be omitted.

In the fluid container 84, the two check valve films 82a and 82b are juxtaposed (superposed) and sandwiched between the two container films 81a and 81b near the guide passage 83, and fixing seal portions 91-92, 85 and 87. These fixing seal portions 91-92 are referred to as outlet portions, the fixing seal portion 85 is referred to as an extended (or widened) portion, and the fixing seal portion 87 is referred to as a narrow down portion. These fixing seal portions also form the structure of the check valve 88 and fix the valve to the first container plastic film 81a at the same time. The fixing seal portions 85 are made by fusing the check valve plastic films 82a and 82b only with the first plastic container film 81a. As a result of this bonding, the check valve 88 is constructed inside the air tube 84.

As has been described, the check valve 88 is made of the two flexible thermoplastic films 81a-81b and an air pipe 98 is created between the first check valve film 82b and the second check valve film 82a. How the compressed air passes through the check valve 88 is shown by white arrows indicated by the numbers 97a, 97b and 97c. The compressed air is supplied from the air guide passage 83 through the air pipe 98 to the air tube 84.

In the check valve 88, the forward air relatively easily flows through the fluid pipe 98 although there exist the fixing seal portions 85, 87 and 91-92. However, the reverse flow in the valve will not easily pass through the air pipe 98. In other words, if the reverse flow occurs in the air pipe 98, it is prevented because of a pressure of the reverse flow itself. By this pressure, the two surfaces of check valve films 82a and 82b which face each other, are brought into intimate contact such as shown in FIG. 17 as will be explained later.

As has been described, in FIGS. 16A-16B, the fixing seal portions 85, 87 and 91-92 also work for guiding the compressed air to flow in the check valve 88. The fixing seal portions are comprised of the portions 91a, 92a, 85a and 87a which bond the two check-valve films 82a and 82b together, and the portions 91b, 92b, 85b and 87b which bond the first container film 81a and the first check valve film 82b together. Accordingly, the air pipe 98 in the check valve 88 is created as a space formed between the two check valve films 82a-82b which excludes the fixing seal portions 91a, 92a, 85a and 87a.

The fixing seal portion 87 are composed of two symmetric line segments (narrow down portions) extended in an upward direction of the drawing, and a width of the air pipe 98 is narrowed down by these portions 87. In other words, the regular flow can easily pass through the air pipe 98 to the air tube 84 when it passes through the wide space to the narrow space created by the narrow down portions 87. On the other hand, the narrow down potions 87 tend to stop the reverse flow from the air tube 84 when the compressed air goes back through the narrow space created by the narrow down portions 87.

The extended portion 85 is formed next to the narrow down portions 87. The shape of the extended portion 85 is similar to a heart shape to make the air flow divert. By passing the compressed air through the extended portion 85, the air diverts, and the air flows around the edge of the extended portion 85 (indicated by the arrow 97b). When the compressed air enters the air tube 84 (forward flow), the air flows naturally in the extended portion 85. On the other hand, the reverse flow cannot directly flow through the narrow down portions 87 because the reverse flow hits the extended portion 85 and is diverted its direction. Thus, the reverse flow cannot practically occur because the flow is not natural. Therefore, the extended portion 85 also functions to prevent the reverse flow.

The outlet portions 91-92 are formed next to the extended portion 85. In this example, the outlet portion 91, extended in perpendicular to the (manufacturing) flow direction H, is formed at the upper center of the check valve 88, and the two outlet portions 92 extended to the (manufacturing) flow direction H are placed symmetrically with respect to the outlet portion 91. There are several spaces among these outlet portions 91 and 92. These spaces constitute a part of the air pipe 98 through which the compressed air can pass as indicated by the arrows 97c. The outlet portions 91-92 are formed as a final passing portion of the check valve 88 when the compressed air is supplied to the air tube 84 and the air diverts in four ways by passing through the outlet portions 91-92.

Accordingly, the reverse flow from the air tube 84 cannot easily pass through the air pipe 98. Thus, the reverse flow is stopped in some degrees by the outlet portions. As has been described, the air passing from the guide passage 83 to the air tube 84 is relatively smoothly propagated through the check valve 88. Further, the narrow down portions 87, extended portions 85 and outlet portions 91-92 formed in the check valve 88 work to prevent the reverse flow of the air.

Figure 17:
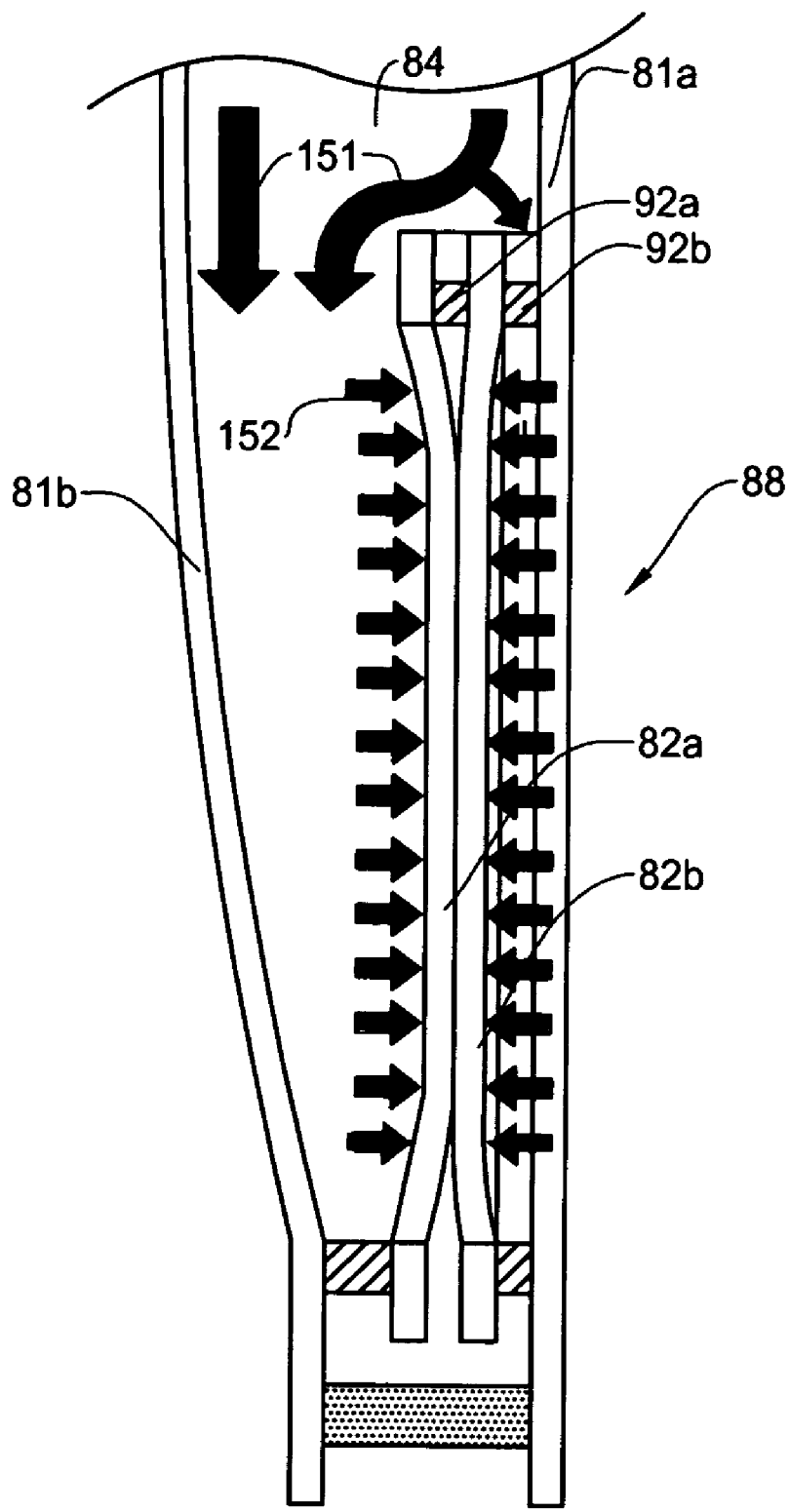
FIG. 17 is a schematic diagram showing the cross sectional view of the check valve of FIGS. 16A-16B used in the bubble wrapping sheet of FIG. 15 of the present invention for explaining how the two check valve films in pairs are tightly closed when compressed air is filled.

FIG. 17 is a cross sectional view showing an effect of the check valve 88 of the present invention. This example shows an inner condition of the check valve 88 when the reverse flow tries to occur in the air tube 84. First, the air hardly enters in the air pipe 98 because the outlet portions 91 and 92 work for the air such that the reverse flow will not easily enter in the outlet portions. Instead, the air flows in a space between the second container film 81*b* and the second valve film 82*a* such as indicated by the arrows 51, and the space is inflated such as shown in FIG. 17. By this expansion, the second check valve film 82*a* is pressed to right, and at the same time, the first valve film 82*b* is pressed to left. As a result, the two check valve films 82*a* and 82*b* are brought into tight contact as indicated with the arrows 52. Thus, the reverse flow of the air is completely prevented.

Further to the example of the production system of FIG. 4, another example of production system for producing the air-packing devices is shown in FIGS. 18A and 18B. The details of this production system is disclosed by U.S. application Ser. No. 10/979,383 by the same assignee of this invention. FIG. 18A is a schematic plan view of the production system and FIG. 18B is a schematic front view of the production system. The production system is to produce the air-packing devices by heat-sealing the thermoplastic films in a bubble wrapping sheet described in the foregoing.

The production system of FIGS. 18A and 18B is basically configured by a film supply section 190, a first heat-seal stage 195, a second heat-seal stage 196, a third heat-seal stage 197, a feeding speed adjuster 198, and a film roller 199. The film supply section 190 includes film rollers 191-193 for supplying first and second thermoplastic films 181, 183 and a check valve film 182 to the heat-seal stages 195-197. Although not shown, the production system includes various sensors to detect and adjust the position of the thermoplastic films. The thermoplastic films 181-183 are repeatedly stopped at the heat-seal stages and moved forward to the next heat-seal stages.

The film supply section 190 includes feeding speed adjuster 194 for adjusting the feeding speed of the film rollers 191-193 and the heat-seal stages 195-197. The film roller 199 is to roll the heat-sealed thermoplastic films for transportation or other process. The feeding speed adjuster 198 is to adjust the feeding speed of the film roller 199 and the heat-seal stages 195-197. Film feeders (not shown) are provided to send the thermoplastic films 181-183 forward in the feeding direction.

Since the rollers 191-193 rotate continuously at the same speed for outputting the thermoplastic films 181-183, but the thermoplastic films 181-183 have to stop repeatedly at the heat-seal stages 195-196, the film feed speed adjuster 194 adjusts the film feeding speed therebetween. Similarly, since the roller 199 rotates continuously at the same speed, but the thermoplastic films 181-183 have to stop repeatedly at the heat-seal stages 195-196, the film feed speed adjuster 98 adjusts the film feeding speed therebetween.

The first heat-seal stage 195 is to bond the first (air-packing) thermoplastic film 181 and the check valve thermoplastic film 182 by heating the films. This is done by superposing a check valve film 182 on the first air-packing thermoplastic film 181, and bonding the check valve thermoplastic film 182 to the first air-packing thermoplastic film 181 by heating the thermoplastic films by a heater in the first heat-seal stage 195. As a result, a plurality of check valves are created for each air container of the air-packing device.

The second heat-seal stage 196 is to bond the first (air-packing) thermoplastic film 181 and the second (air-packing) thermoplastic film 183 at predetermined bonding areas such as side seals 47 of FIGS. 10A-10G and FIGS. 11-15 by heating the films. This is done by superposing the second air-packing thermoplastic film 183 on the first air-packing thermoplastic film 181 while sandwiching the check valve film 182 therebetween, and bonding the first air-packing thermoplastic film and the second air-packing thermoplastic film by heating the thermoplastic films by a heater in the second heat-seal stage 196. Thus, a plurality of air tubes are created on the bubble wrapping sheet where the check valve is provided for each air tube.

The third heat-seal stage 197 is to bond the first air-packing thermoplastic film 181 and the second air-packing thermoplastic film 183 at predetermined bonding areas such as bubble partition seals 43 of FIGS. 10A-10G and FIGS. 11-15 heating the films. In the case where the second heat-seal stage 196 is designed to also perform the heat-seal step to create the bubble partition seals 43, the third heat-seal stage 197 will be unnecessary. A heat resistant film (not shown) provided between the thermoplastic films and the heater is moved in a direction opposite to the feeding direction of the thermoplastic film immediately after each bonding step before moving the thermoplastic films forward in the feeding direction. The details of this operation involving the heat resistant film is disclosed by the above noted U.S. application Ser. No. 10/979,383.

Although the invention is described herein with reference to the preferred embodiments, one skilled in the art will readily appreciate that various modifications and variations may be made without departing from the spirit and the scope of the present invention. Such modifications and variations are considered to be within the purview and scope of the appended claims and their equivalents.

What is claimed is:

1. An inflatable bubble wrapping sheet that sealingly contains air for protecting a product, comprising:

first and second thermoplastic films superposed with each other;

tube partition seals to create a plurality of air tubes by heat sealing the first and second thermoplastic films;

bubble partition seals located between said tube partition seals to partition each of said air tubes into a plurality of air bubbles by heat sealing the first and second thermoplastic films, where a length of said bubble portion seal is shorter than a width between two adjacent tube partition seals;

a plurality of check valves established between said first and said second thermoplastic films for the air tubes, each of the check valves allowing the air to flow in a predetermined direction;

an air input formed on one of the check valves to supply the air to all of the air tubes through the check valves;

a check valve film bonded to at least one of the thermoplastic films to form the plurality of check valves;

a common air duct portion formed between the check valve film and the at least one of the thermoplastic films, wherein the common air duct portion includes peeling agents covering at least portions of the tube partition seals within the common air duct potion; and wherein each of the said check valves is configured by an air flow maze portion forming an air passage of a zig-zag shape for supplying the air to the air tubes each having the serially connected air bubbles, and a common air duct portion which provides the air to the air flow maze portion of an air tube as well as to the air flow maze portion of a next air tube.

2. An inflatable bubble wrapping sheet that sealingly contains air for protecting a product, as defined in claim 1, wherein each of said bubble partition seals has a shape of a thin straight line.

3. An inflatable bubble wrapping sheet that sealingly contains air for protecting a product, as defined in claim 1, wherein each of said bubble partition seals has a predetermined width in a longitudinal direction of said air tubes so that there is a predetermined distance between adjacent air bubbles.

4. An inflatable bubble wrapping sheet that sealingly contains air for protecting a product, as defined in claim 1, wherein each of said bubble partition seals is inwardly curved so that each of said air bubbles becomes circular.

5. An inflatable bubble wrapping sheet that sealingly contains air for protecting a product, as defined in claim 1, wherein each of said tube partition seals has a shape of a thin straight line.

6. An inflatable bubble wrapping sheet that sealingly contains air for protecting a product, as defined in claim 1, wherein each of said tube partition seals has a predetermined width in a transversal direction of said air tubes so that there is a predetermined distance between adjacent air tubes.

7. An inflatable bubble wrapping sheet that sealingly contains air for protecting a product, as defined in claim 1, wherein each of said tube partition seals has a wave-like configuration with a curvature so that each of said air bubbles becomes circular.

8. An inflatable bubble wrapping sheet that sealingly contains air for protecting a product, as defined in claim 1, wherein said check valve film is a first check valve film, a second check valve film is provided between the first check valve film and one of said first and second thermoplastic films.

9. An inflatable bubble wrapping sheet that sealingly contains air for protecting a product, as defined in claim 1, wherein two or more sets of check valves are provided at any desired locations of the bubble wrapping sheet.

10. An inflatable bubble wrapping sheet that sealingly contains air for protecting a product, as defined in claim 9, a master check valve is disposed at an air input of the bubble wrapping sheet to provide the air to the two or more sets of check valves.

11. An inflatable bubble wrapping sheet that sealingly contains air for protecting a product, as defined in claim 1, wherein at least the air passage in said air flow maze portion is closed by air tightly contacting the check valve film with one of said first and second thermoplastic films by the air pressure within the air tubes when the bubble wrapping sheet is filled with the air to a sufficient degree.

12. An inflatable bubble wrapping sheet that sealingly contains air for protecting a product, comprising:
   first and second thermoplastic films superposed with each other;
   a plurality of tube partition seals configured to create a plurality of air tubes by heat sealing the first and second thermoplastic films;
   bubble partition seals located between said tube partition seals to partition each of said air tubes into a plurality of air bubbles by heat sealing the first and second thermoplastic films, wherein a length of said bubble portion seal is shorter than a width between two adjacent tube partition seals; and
   a check valve established at an input of each of the air tubes between the first and second thermoplastic films for allowing an air flow of only one predetermined direction, said check valve being formed of first and second check valve films juxtaposed with each other;
   wherein said check valve includes a narrow down bonded portion forming a narrow down fluid passage, and an extended bonded portion forming an island downstream of the narrow down bonded portion, and wherein the check valve is bonded to the first thermoplastic film through at least one of the narrow down bonded portion and the extended bonded portion in such a way that the check valve tightly contacts the first thermoplastic film when a reverse air flow is about to occur, thereby closing the check valve and preventing the reverse air flow.

13. An inflatable bubble wrapping sheet that sealingly contains air for protecting a product, as defined in claim 12, wherein each of said bubble partition seals has a shape of a thin straight line.

14. An inflatable bubble wrapping sheet that sealingly contains air for protecting a product, as defined in claim 12, wherein each of said bubble partition seals has a predetermined width in a longitudinal direction of said air tubes so that there is a predetermined distance between adjacent air bubbles.

15. An inflatable bubble wrapping sheet that sealingly contains air for protecting a product, as defined in claim 12, wherein each of said bubble partition seats is inwardly curved so that each of said air bubbles becomes circular.

16. An inflatable bubble wrapping sheet that sealingly contains air for protecting a product, as defined in claim 12, wherein each of said tube partition seals has a shape of a thin straight line.

17. An inflatable bubble wrapping sheet that sealingly contains air for protecting a product, as defined in claim 12, wherein each of said tube partition seals has a predetermined width in a transversal direction of the air tubes so that there is a predetermined distance between adjacent air tubes.

18. An inflatable bubble wrapping sheet that sealingly contains air for protecting a product, as defined in claim 12, wherein each of said tube partition seals has a wave-like configuration with a curvature so that each of said air bubbles becomes circular.

* * * * *